United States Patent
Boonsom et al.

(10) Patent No.: US 10,145,711 B2
(45) Date of Patent: Dec. 4, 2018

(54) OPTICAL ENCODER WITH DIRECTION-DEPENDENT OPTICAL PROPERTIES HAVING AN OPTICALLY ANISOTROPIC REGION TO PRODUCE A FIRST AND A SECOND LIGHT DISTRIBUTION

(71) Applicant: Apple Inc., Cupertino, CA (US)

(72) Inventors: Paisith P. Boonsom, Concord, CA (US); Serhan O. Isikman, Sunnyvale, CA (US); Richard Ruh, Monte Serano, CA (US); Prashanth S. Holenarsipur, Fremont, CA (US); Colin M. Ely, Sunnyvale, CA (US); William N. Pickeral, San Jose, CA (US); Jairam Manjunathaiah, Cupertino, CA (US); David G. Havskjold, Portola Valley, CA (US); Anant Rai, San Jose, CA (US); Maegan K. Spencer, Emerald Hills, CA (US); Milind S. Bhagavat, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 51 days.

(21) Appl. No.: 15/060,069

(22) Filed: Mar. 3, 2016

(65) Prior Publication Data

US 2016/0258784 A1 Sep. 8, 2016

Related U.S. Application Data

(60) Provisional application No. 62/128,914, filed on Mar. 5, 2015, provisional application No. 62/130,064, filed
(Continued)

(51) Int. Cl.
*G01D 5/347* (2006.01)

(52) U.S. Cl.
CPC ......... *G01D 5/347* (2013.01); *G01D 5/34715* (2013.01)

(58) Field of Classification Search
CPC .............................. G01D 5/3473; G01D 5/347
(Continued)

(56) References Cited

U.S. PATENT DOCUMENTS

| 2,237,860 A | 4/1941 | Bolle |
| 2,288,215 A | 6/1942 | Taubert et al. |

(Continued)

FOREIGN PATENT DOCUMENTS

| CH | 1888928 | 1/1937 |
| CN | 1302740 | 9/2001 |

(Continued)

OTHER PUBLICATIONS

International Search Report and Written Opinion, PCT/US2016/020760, 6 pages, dated Aug. 17, 2016.
(Continued)

*Primary Examiner* — Que T Le
(74) *Attorney, Agent, or Firm* — Brownstein Hyatt Farber Schreck, LLP

(57) ABSTRACT

Embodiments of the present disclosure provide an optical encoder for an electronic device. The optical encoder includes a spindle and an encoded pattern disposed around a circumference of the spindle. The encoded pattern may include one or more surface features that create a direction-dependent reflective region.

24 Claims, 20 Drawing Sheets

Related U.S. Application Data on Mar. 9, 2015, provisional application No. 62/144,885, filed on Apr. 8, 2015.

(58) Field of Classification Search
USPC .......................................... 250/231.13, 239
See application file for complete search history.

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 4,007,347 A | 2/1977 | Haber |
| 4,031,341 A | 6/1977 | Wuthrich et al. |
| 4,037,068 A | 7/1977 | Gaynor |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,581,509 A | 4/1986 | Sanford et al. |
| 4,600,316 A | 7/1986 | Besson |
| 4,617,461 A | 10/1986 | Subbarao et al. |
| 4,634,861 A * | 1/1987 | Ching ................ G01D 5/34792 250/229 |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A * | 4/1990 | Kanezashi ................ G01B 3/12 33/780 |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,509,174 A | 4/1996 | Worrell |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,963,332 A | 10/1999 | Feldman et al. |
| 6,069,567 A | 5/2000 | Zawilski |
| 6,134,189 A | 10/2000 | Carrard |
| 6,154,201 A | 11/2000 | Levin et al. |
| 6,175,679 B1 | 1/2001 | Veligdan et al. |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,646,635 B2 | 11/2003 | Pogatetz et al. |
| 6,661,438 B1 | 11/2003 | Billman |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,888,076 B2 | 5/2005 | Hetherington |
| 6,896,403 B1 * | 5/2005 | Grau ..................... G04C 3/005 368/190 |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,977,868 B2 | 12/2005 | Brewer et al. |
| 6,985,107 B2 | 1/2006 | Anson |
| 6,987,568 B2 | 1/2006 | Dana |
| 6,998,553 B2 | 2/2006 | Hisamune et al. |
| 7,016,263 B2 | 3/2006 | Gueissaz et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,119,289 B2 | 10/2006 | Lacroix |
| 7,135,673 B2 | 11/2006 | Saint Clair |
| 7,167,083 B2 | 1/2007 | Giles |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,597 B2 | 9/2010 | Silverstein et al. |
| 7,856,255 B2 | 12/2010 | Tsuchiya et al. |
| 7,858,583 B2 | 12/2010 | Schmidt et al. |

(56) References Cited

U.S. PATENT DOCUMENTS

| | | |
|---|---|---|
| 7,865,324 B2 | 1/2011 | Lindberg |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,294,670 B2 | 10/2012 | Griffin et al. |
| 8,312,495 B2 | 11/2012 | Vanderhoff |
| 8,368,677 B2 | 2/2013 | Yamamoto |
| 8,371,745 B2 | 2/2013 | Manni |
| 8,373,661 B2 | 2/2013 | Lan et al. |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,783,944 B2 | 2/2014 | Doi |
| 8,666,682 B2 | 3/2014 | LaVigne et al. |
| 8,704,787 B2 | 4/2014 | Yamamoto |
| 8,711,093 B2 | 4/2014 | Ong et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahash |
| 8,905,631 B2 | 12/2014 | Sakurazawa et al. |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,994,827 B2 | 3/2015 | Mistry et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,041,663 B2 | 5/2015 | Westerman |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,101,184 B2 | 8/2015 | Wilson |
| 9,105,413 B2 | 8/2015 | Hiranuma et al. |
| 9,123,483 B2 | 9/2015 | Ferri et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,532,723 B2 | 1/2017 | Kim |
| 9,545,541 B2 | 1/2017 | Aragones et al. |
| 9,552,023 B2 | 1/2017 | Joo et al. |
| 9,599,964 B2 | 3/2017 | Gracia |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,659,482 B2 | 5/2017 | Yang et al. |
| 9,680,831 B2 | 6/2017 | Jooste et al. |
| D800,172 S | 10/2017 | Akana |
| 9,800,717 B2 | 10/2017 | Ma et al. |
| 9,836,025 B2 | 12/2017 | Ely et al. |
| 9,946,297 B2 | 4/2018 | Nazzaro et al. |
| 9,971,305 B2 | 5/2018 | Ely et al. |
| 10,001,817 B2 | 6/2018 | Zambetti et al. |
| 2003/0174590 A1 | 9/2003 | Arikawa et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0211042 A1 | 9/2007 | Kim et al. |
| 2007/0222756 A1 | 9/2007 | Wu et al. |
| 2007/0247421 A1 | 10/2007 | Orsley et al. |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0261405 A1 | 10/2013 | Lee et al. |
| 2013/0335196 A1 | 12/2013 | Zhang et al. |
| 2014/0071050 A1 | 3/2014 | Armstrong-Muntner |
| 2014/0071098 A1 | 3/2014 | You |
| 2014/0132516 A1 | 5/2014 | Tsai et al. |
| 2014/0197936 A1 | 7/2014 | Biggs et al. |
| 2014/0327630 A1 | 11/2014 | Burr et al. |
| 2014/0340318 A1 | 11/2014 | Stringer et al. |
| 2014/0347289 A1 | 11/2014 | Suh et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0227217 A1 | 8/2015 | Fukumoto |
| 2015/0341031 A1 | 11/2015 | Marquas et al. |

(56) References Cited

U.S. PATENT DOCUMENTS

| | | | |
|---|---|---|---|
| 2016/0018846 A1 | 1/2016 | Zenoff | |
| 2016/0054813 A1 | 2/2016 | Shediwy et al. | |
| 2016/0058375 A1 | 3/2016 | Rothkopf et al. | |
| 2016/0061636 A1 | 3/2016 | Gowreesunker et al. | |
| 2016/0062623 A1 | 3/2016 | Howard et al. | |
| 2016/0069713 A1* | 3/2016 | Ruh | G01D 5/34715 250/231.14 |
| 2016/0098016 A1 | 4/2016 | Ely et al. | |
| 2016/0103985 A1 | 4/2016 | Shim et al. | |
| 2016/0109861 A1 | 4/2016 | Kim et al. | |
| 2016/0116306 A1 | 4/2016 | Ferri et al. | |
| 2016/0147432 A1 | 5/2016 | Shi et al. | |
| 2016/0168178 A1 | 6/2016 | Misra | |
| 2016/0170598 A1 | 6/2016 | Zambetti et al. | |
| 2016/0170608 A1 | 6/2016 | Zambetti et al. | |
| 2016/0170624 A1 | 6/2016 | Zambetti et al. | |
| 2016/0253487 A1 | 9/2016 | Sarkar et al. | |
| 2016/0259301 A1 | 9/2016 | Ely | |
| 2016/0306437 A1 | 10/2016 | Zhang et al. | |
| 2016/0306446 A1 | 10/2016 | Chung et al. | |
| 2016/0313703 A1 | 10/2016 | Ely et al. | |
| 2016/0320583 A1 | 11/2016 | Hall, Jr. | |
| 2016/0327911 A1 | 11/2016 | Eim et al. | |
| 2016/0378069 A1 | 12/2016 | Rothkopf et al. | |
| 2016/0378070 A1 | 12/2016 | Rothkopf et al. | |
| 2016/0378071 A1 | 12/2016 | Rothkopf et al. | |
| 2016/0378072 A1 | 12/2016 | Ely et al. | |
| 2017/0003655 A1 | 1/2017 | Ely | |
| 2017/0010751 A1 | 1/2017 | Shedletsky | |
| 2017/0011210 A1 | 1/2017 | Cheong et al. | |
| 2017/0031449 A1 | 2/2017 | Karsten et al. | |
| 2017/0045958 A1 | 2/2017 | Battlogg et al. | |
| 2017/0061863 A1 | 3/2017 | Eguchi | |
| 2017/0069443 A1 | 3/2017 | Wang et al. | |
| 2017/0069444 A1 | 3/2017 | Wang et al. | |
| 2017/0069447 A1 | 3/2017 | Wang et al. | |
| 2017/0104902 A1 | 4/2017 | Kim et al. | |
| 2017/0139489 A1 | 5/2017 | Chen et al. | |
| 2017/0192391 A1 | 7/2017 | Ely et al. | |
| 2017/0216668 A1 | 8/2017 | Burton et al. | |
| 2017/0238138 A1 | 8/2017 | Aminzade | |
| 2017/0248986 A1 | 8/2017 | Jackson et al. | |
| 2017/0251561 A1 | 8/2017 | Fleck et al. | |
| 2017/0269715 A1 | 9/2017 | Kim et al. | |
| 2017/0285404 A1 | 10/2017 | Kubota et al. | |
| 2017/0301314 A1 | 10/2017 | Kim et al. | |
| 2017/0307414 A1 | 10/2017 | Ferri et al. | |
| 2017/0331869 A1 | 11/2017 | Bendahan et al. | |
| 2017/0357465 A1 | 12/2017 | Dzeryn et al. | |
| 2018/0018026 A1 | 1/2018 | Bushnell et al. | |
| 2018/0024683 A1 | 1/2018 | Ely et al. | |
| 2018/0136613 A1 | 5/2018 | Ely et al. | |
| 2018/0136686 A1 | 5/2018 | Jackson et al. | |

FOREIGN PATENT DOCUMENTS

| | | | |
|---|---|---|---|
| CN | 1445627 | 10/2003 | |
| CN | 1504843 | 6/2004 | |
| CN | 1624427 | 6/2005 | |
| CN | 1792295 | 6/2006 | |
| CN | 101201587 | 6/2008 | |
| CN | 201081979 | 7/2008 | |
| CN | 101750958 | 6/2010 | |
| CN | 101923314 | 12/2010 | |
| CN | 202008579 | 10/2011 | |
| CN | 102890443 | 1/2013 | |
| CN | 202710937 | 1/2013 | |
| CN | 103191557 | 7/2013 | |
| CN | 103253067 | 8/2013 | |
| CN | 103645804 | 3/2014 | |
| CN | 203564224 | 4/2014 | |
| CN | 103852090 | 6/2014 | |
| CN | 203630524 | 6/2014 | |
| CN | 103956006 | 7/2014 | |
| CN | 203693601 | 7/2014 | |
| CN | 203732900 | 7/2014 | |
| CN | 103995456 | 8/2014 | |
| CN | 203941395 | 11/2014 | |
| CN | 104777987 | 4/2015 | |
| CN | 104880937 | 9/2015 | |
| CN | 204650147 | 9/2015 | |
| CN | 105096979 | 11/2015 | |
| CN | 105547146 | 5/2016 | |
| DE | 3706194 | 9/1988 | |
| DE | 102008023651 | 11/2009 | |
| EP | 0556155 | 8/1993 | |
| EP | 1345095 | 9/2003 | |
| EP | 1669724 | 6/2006 | |
| EP | 1832969 | 9/2007 | |
| EP | 2375295 | 10/2011 | |
| EP | 2720129 | 4/2014 | |
| FR | 2030093 | 10/1970 | |
| FR | 2801402 | 5/2001 | |
| GB | 2433211 | 6/2007 | |
| JP | S5708582 | 1/1982 | |
| JP | S5734457 | 2/1982 | |
| JP | H02285214 | 11/1990 | |
| JP | H04093719 | 3/1992 | |
| JP | H05203465 | 8/1993 | |
| JP | H05312595 | 11/1993 | |
| JP | H06347293 | 12/1994 | |
| JP | 11121210 | 4/1999 | |
| JP | H11191508 | 7/1999 | |
| JP | 2001202178 | 7/2001 | |
| JP | 2003151410 | 5/2003 | |
| JP | 2003331693 | 11/2003 | |
| JP | 2004184396 | 7/2004 | |
| JP | 2007248176 | 9/2007 | |
| JP | 2007311153 | 11/2007 | |
| JP | 2008053980 | 3/2008 | |
| JP | 2008122124 | 5/2008 | |
| JP | 2008122377 | 5/2008 | |
| JP | 2008170436 | 7/2008 | |
| JP | 2008235226 | 10/2008 | |
| JP | 2009070657 | 4/2009 | |
| JP | 2010032545 | 2/2010 | |
| JP | 2010186572 | 8/2010 | |
| JP | 2010244797 | 10/2010 | |
| JP | 2011165468 | 8/2011 | |
| JP | 2013079961 | 5/2013 | |
| JP | 2014174031 | 9/2014 | |
| KR | 20010030477 | 4/2001 | |
| KR | 20080045397 | 5/2008 | |
| NL | 1040225 | 11/2014 | |
| TW | 200633681 | 10/2006 | |
| WO | WO01/22038 | 3/2001 | |
| WO | WO2001/069567 | 9/2001 | |
| WO | WO2010/058376 | 5/2010 | |
| WO | WO2012/083380 | 6/2012 | |
| WO | WO2012/094805 | 7/2012 | |
| WO | WO2014/018118 | 1/2014 | |
| WO | WO2015/147756 | 10/2015 | |
| WO | WO 2015147756 A1 * | 10/2015 | G01D 5/342 |
| WO | WO2016/104922 | 6/2016 | |
| WO | WO2016/155761 | 10/2016 | |

OTHER PUBLICATIONS

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iPhone and iPod touch," http://www.

(56) References Cited

OTHER PUBLICATIONS amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, "Vyzin Electronics Private Limited launches Vesag Watch," http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.
Author Unknown, "Desirable Android Wear smartwatch from LG," Gulf News, Dubai, 3 pages, Jan. 30, 2015.
Author Unknown, "Fossil Q ups smartwatch game with handsome design and build," Business Mirror, Makati City, Philippines, 3 pages, Dec. 20, 2016.
Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.

* cited by examiner

OPTICAL ENCODER WITH DIRECTION-DEPENDENT OPTICAL PROPERTIES HAVING AN OPTICALLY ANISOTROPIC REGION TO PRODUCE A FIRST AND A SECOND LIGHT DISTRIBUTION

CROSS-REFERENCE TO RELATED APPLICATIONS

This application is a nonprovisional patent application of and claims the benefit of U.S. Provisional Patent Application No. 62/144,885, filed Apr. 8, 2015 and titled "Optical Encoder with Direction-Dependent Optical Properties," U.S. Provisional Patent Application No. 62/130,064, filed Mar. 9, 2015 and titled "Optical Encoder with Anisotropic Optical Surface," and U.S. Provisional Patent Application No. 62/128,914, filed Mar. 5, 2015 and titled "Optical Encoder with Anisotropic Optical Surface," the disclosures of each which are hereby incorporated herein by reference in their entirety.

FIELD

The present disclosure is generally directed to optical encoders for an electronic device and, more specifically, to an optical encoder having one or more reflective regions with direction-dependent optical properties.

BACKGROUND

Many devices, including mechanical, electronic, and computerized devices, may utilize various types of sensors for obtaining user input or receiving motion input from other aspects of the device. Traditionally, a rotary sensor may be used to measure rotary motion of a device or component. However, many traditional rotary sensors are not well adapted for use in a small or compact space that may be required for an electronic device having a small form factor. It is with respect to these and other general considerations that embodiments have been made.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide an optical encoder for an electronic device. The optical encoder may include a cylindrical spindle having alternating, optically-contrasting elements that extend along the axial direction of the spindle. The optical elements may include a plurality of stripes or markings that are axially disposed or lengthwise around the outer surface of the cylindrical spindle. The optical encoder may also include an optical sensor. In some embodiments, the optical sensor includes an optical emitter, such as a light emitting diode, and an optical detector, such as a photodiode array. The emitter and detector may be radially aligned with respect to the cylindrical spindle or axially aligned with respect to the cylindrical spindle.

In some embodiments, the optically contrasting elements include regions having a direction-dependent reflective property. For example, the optically contrasting elements may include an array of anisotropic reflecting regions that has a first light distribution for light reflected along a first direction and have a second, wider light distribution along a second direction. In some cases, the anisotropic reflecting regions may diffuse or spread the light along a direction that corresponds to the length of the feature, which may improve the ability to detect reflected light consistently and reliably even though there may be dimensional variations or movement between various components of the encoder. Additionally, the anisotropic reflecting regions may reflect the light in a non-distributed or specular manner in a direction perpendicular to the length of the feature to improve the contrast between reflective and non-reflective regions.

Some example embodiments include an optical encoder incorporated into an electronic device. The optical encoder may include a spindle and an optical emitter configured to illuminate a portion of the spindle. The optical encoder may also include an optical detector that is configured to receive light reflected from the spindle. An encoded pattern may be formed on an outer surface of the spindle and may include an array of contrasting regions extending along a length of the spindle. The array of contrasting regions may include a set of anisotropic reflecting regions interspersed with a set of optically-absorptive regions.

In some implementations, the anisotropic reflecting regions are configured to produce a reflected-light distribution that varies in accordance with a direction of reflected light. In some implementations, each anisotropic reflecting region is configured to produce a first type of reflection having a first reflected-light distribution for light along a transverse plane that is perpendicular to a central axis of the spindle, and produce a second type of reflection having a second reflected-light distribution for light along a longitudinal plane that passes through the central axis of the spindle. In some cases, the second reflected-light distribution is wider than the first reflected-light distribution.

In some embodiments, each anisotropic reflecting region of the set of anisotropic reflecting regions is formed from a series of concave-shaped features that at least partially encircles the outer surface of the spindle. In some implementations, the series of concave-shaped features has a depth to radius ratio between a maximum ratio of 13:1 and a minimum ratio of 7:1.

In some embodiments, the series of concave-shaped features is formed as a continuous spiral encircling the outer surface of the spindle. In some embodiments, each anisotropic reflecting region of the set of anisotropic reflecting regions is formed from a series of convex-shaped features that at least partially encircles the outer surface of the spindle. In some embodiments, the set of optically-absorptive regions is formed by laser etching the outer surface of the spindle to form a set of flattened regions. In some embodiments, the set of optically-absorptive regions is formed by depositing an ink on the outer surface of the spindle.

In some implementations, the optical detector includes an array of photodiodes that is arranged along the length to the spindle. In some implementations, the optical detector includes an array of photodiodes that is arranged along a direction that is transverse to the length of the spindle.

Some example embodiments include a portable electronic device having a housing, a display positioned within an opening of the housing, and a crown attached to the housing and configured to receive rotational input from a user. In some embodiments, an optical encoder is operatively coupled to the crown and configured to measure the rotational input. The optical encoder may include a spindle, an optical sensor configured to detect light reflected from the spindle, and an array of alternating regions formed on and extending along a length of the spindle. In some embodiments, the electronic device includes a shaft that is operatively coupled to the crown, and the spindle is disposed over a portion of the shaft. In some embodiments, the spindle is molded from a polymer material and coated with a reflective metal material.

In some embodiments, the spindle includes an array of flat facet features that extend at least partially along the length the spindle. The facet features may be configured to produce alternating light and dark reflections on the optical sensor. In some embodiments, the spindle includes an array of concave features that extend at least partially along the length of the spindle. The concave features may be configured to produce alternating light and dark reflections on the optical sensor.

Some example embodiments include a method of detecting rotational movement of a spindle disposed within a housing of an electronic device. The method may include illuminating a portion of the spindle, wherein the spindle includes an encoded pattern of optically distinct markings formed along a length of the spindle. The marking may cause a direction-dependent reflection off the surface of the spindle. The method may also include rotating the spindle, receiving the reflected light using an array of photodiodes, and determining an amount of rotation of the spindle based on reflected light. In some embodiments, determining a direction of rotation based on the reflected light is performed by comparing a first output current of each photodiode in the array of photodiodes at a first time to a second output current of each photodiode in the array of photodiodes at a second time. In some embodiments, the amount of rotation is based on an estimated number of optically distinct markings that pass the array of photodiodes

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
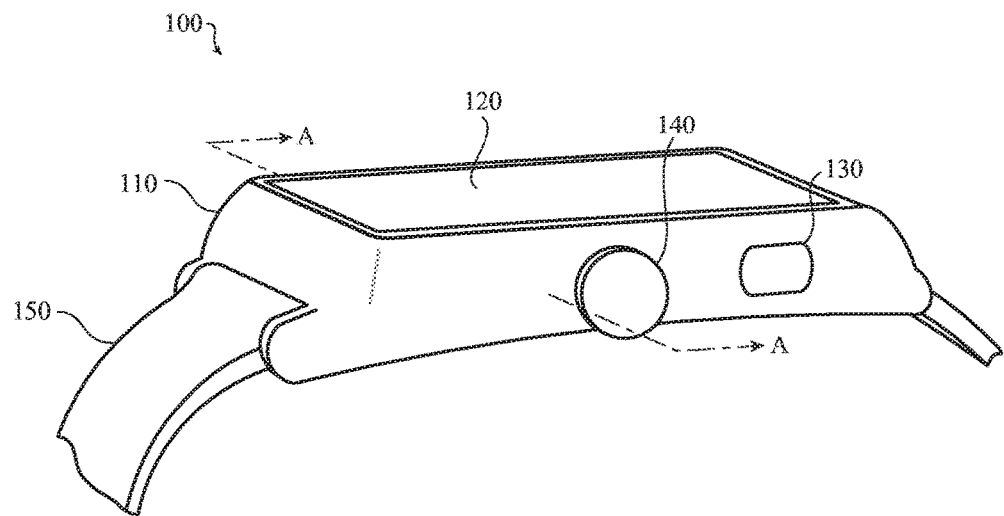
FIG. 1A illustrates an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some electronic devices include one or more user-input devices for receiving input from a user. Example user input devices, including touch sensors, buttons, slides, dials, and knobs may be used to provide feedback or commands to the device for performing functions or for providing user input to software or other operations of the device. As described in more detail below, an electronic device may include a dial-type rotary input, such as a crown commonly associated with a wristwatch. Many traditional dials use a series of electromechanical contacts or a potentiometer to measure the rotation of a dial. However, some traditional electromagnetic systems may be too large or lack the precision to measure small rotational input on a device as small as a wristwatch.

As described herein, an optical encoder may be used to measure the direction, amount, speed, and other qualities of a rotational input. An optical encoder may be advantageous over some traditional systems by improving the precision of a rotational measurement. Additionally, in accordance with some embodiments described herein, an optical encoder may occupy a smaller space than some traditional electromechanical systems, which facilitates integration into devices having compact form factors. Optical encoders may also be used to provide a range of rotational measurements, such as direction of rotation, amount of rotation, rate of rotation, change in the rate of rotation, and so on.

As will be explained below, the optical encoder of the present disclosure includes an optical emitter, an optical detector, and a rotating element having a round surface such as a shaft, spindle, cylindrical member, or the like. Unlike some typical optical encoders, the optical encoder of the present disclosure utilizes an encoded pattern disposed directly on the outer or outward-facing surface of the rotating element. In some cases, the encoded pattern includes an array of contrasting or alternating regions extending along the length of the rotating element and arranged in a stripe-like pattern around the outer surface. The regions may reflect light in different ways and can be used to measure the movement of the rotating element. In some cases, the contrasting regions are formed from alternating light and dark regions of the surface. In some cases, the regions are formed from alternating reflective and non-reflective regions. In some cases, the regions have alternating contours that are configured to create an alternating reflection having light and dark portions that may be detected by an optical detector of the encoder.

In some implementations, the alternating regions on the rotating element form an encoded sequence that can be detected by measuring the light reflected off or received from the surface of the rotating element. In some cases, the optical detector is configured to detect light emitted by the optical emitter and reflected off the rotating element. The reflected light may be used to determine the (angular) position of the rotating element based on the location of the one or more of the alternating regions as the rotating element is turned or rotated. In some cases, movement of the encoded sequence, as measured by the optical detector, may be used to determine a direction of rotation, amount of rotation, rate of rotation, change in the rate of rotation, and other qualities of the movement of the rotating element. In accordance with some embodiments, the rotational measurements are used to control an element or function of the device, such as the manipulation of a user interface element on the display, the selection of an item within a list, and so on.

In accordance with some embodiments described herein, the contrasting or alternating regions may include an array of direction-dependent light-reflecting regions that produce a relatively narrowly distributed beam of light reflected along a first direction and a more widely distributed beam of light reflected along a second direction that is transverse to the first direction. In some cases, the direction-dependent reflecting regions are referred to as anisotropic reflecting regions or optically anisotropic regions. These regions may be used to create an optical system that is more robust or forgiving of dimensional or geometric variations in the system. In some cases, an optically anisotropic surface or region may facilitate reliable encoder operation even when mechanical movements, dimensional variations, and other limitations of the hardware affect the optical path of the light within the optical encoder. The regions may also help to increase the optical contrast between the alternating regions, which may improve the reliability or power usage of the optical encoder.

In some embodiments, an optically isotropic or anisotropic reflecting region is configured to produce a first type of reflection having a first, narrow beam spread for light along a transverse plane that is perpendicular to a central axis of a rotating element. The anisotropic reflecting region may also produce a second type of reflection having a second, wider beam spread for light along a longitudinal plane that passes through the central axis of the rotating element.

In some embodiments, the second type of reflection may be referred to as effectively diffuse because the reflected light spreads over a wider range of angles as compared to the first type of reflection, which is substantially specular and spreads light over a narrower range of angles. As described in some of the examples provided herein, the anisotropic reflection may be formed by a series of convex- or concave-shaped features formed into the surface of the rotating element. In some cases, the reflective properties of the anisotropic reflecting region is determined by the geometry of the feature. For example, a ratio of feature depth to feature radius may by tuned to provide a particular reflective property.

In some embodiments, the rotating element may have a contoured, fluted, or faceted shape that directs light toward and/or away from the optical detector as the rotating element is rotated. The shape of the rotating element may produce a reflection having alternating light and dark portions that may pass across the optical detector and may be used to interpret or measure rotation of the rotating element. In some cases, the contoured, fluted, or faceted shape simulates a diffractive pattern, which includes the alternating light and dark regions that may be detected by the optical detector.

As mentioned previously, an optical encoder may be incorporated into a user-input device of an electronic device. FIG. 1A illustrates an example electronic device 100 according to one or more embodiments of the present disclosure. In one example and as shown in FIG. 1, the electronic device 100 may be a wearable device, which may be configured to perform as a timekeeping device (e.g., watch), health monitoring device, navigational device, and so on. While the depicted device 100 resembles a wearable wristwatch device, the device 100 may include any type of mechanical, electromechanical, or electronic device. In some embodiments, the electronic device 100 may include one of a variety of portable electronic devices or portable computing devices. Examples include cell phones, smart phones, tablet computers, laptop computers, time-keeping devices, computerized glasses and other wearable devices navigation devices, sports devices, accessory devices, health-monitoring devices, medical devices, and the like.

The electronic device 100 may include a housing 110, a display 120 positioned within an opening formed in a top surface of the housing 110. Generally, the display 120 may be used to present visual output to the user. For example, the display 120 may be used to present or display a graphical user interface having one or more graphical elements. The electronic device 100 may also include one or more user input devices, including, for example, a touch screen integrated with the display 120, a button 130 (or other input mechanism) positioned on a surface of the housing 110, and a crown 140 positioned on a side surface of the housing 110. In the present example, the crown 140 includes a dial or knob for receiving rotational input from the user and is operatively coupled to an optical encoder used to measure rotation of the dial or knob.

In some examples, the wearable device 100, such as is depicted in FIG. 1A, may include a processor coupled with or in communication with a memory, one or more communication interfaces, output devices such as displays and speakers, and one or more additional input devices such as buttons, dials, microphones, or touch-based interfaces. The communication interface(s) can provide electronic communications between the electronic device and any external communication network, device or platform, such as but not limited to wireless interfaces, Bluetooth interfaces, Near Field Communication (NFC) interfaces, infrared interfaces, Universal Serial Bus (USB) interfaces, Wi-Fi interfaces, Transmission Control Protocol/Internet Protocol (TCP/IP) interfaces, network communications interfaces, or other communication interface. The wearable electronic device 100 may include computer-readable instructions or software that is configured to be executed by the processor to perform various functions or operations. In some cases, the device 100 may be configured to provide information regarding time, health, event notifications, device status, and other information. The device 100 may also be externally connected to or communicating with separate devices and/or software executing on separate devices. In some cases, the device 100 may be configured to send and receive messages, video, and commands, in addition to other electronic communications.

In some embodiments, the display 120 is configured to output a graphical user interface that displays information about the electronic device 100, as well as other information that is stored in a memory of the electronic device 100. For example, the user interface may present information corresponding to one or more applications that are being executed on the electronic device 100. Such applications may include a time keeping application, an email application, a phone application, a calendaring application, a game application, and the like.

In some embodiments, and as will be discussed below, an optical encoder may be used to determine movement or actuation information associated with the crown 140. More specifically, the optical encoder may be used to detect aspects of the rotation of the crown 140, including the direction of the movement, amount of movement, rate of movement, change in the rate of movement, and so on. The movement may be rotational movement, translational movement, angular movement, and so on. Output from the encoder representing movement of the crown 140 may be used as input to the device 100. For example, the encoder output may be used to manipulate graphics, images, icons, and/or other graphical elements of a user interface on the display 120 of the electronic device 100.

In some embodiments, the button 130 or the crown 140 may be used to select, adjust or change various images that are output on the display 120. For example, if the display 120 of the electronic device 100 is used to display a time keeping application that simulates the face of a watch, the crown 140 may be used to adjust the position of the hands or index the digits that are displayed for the watch face simulation. In other embodiments, the crown 140 may be rotated to move a cursor or other type of selection mechanism from a first displayed location to a second displayed location in order to select an icon or move the selection mechanism between various icons that are output on the display 120. Likewise, the crown 140 may be pushed, pressed, or otherwise actuated to provide another input to the device 100.

For example, in accordance with a time keeping function or software application, the crown 140 may be rotated in a clockwise manner in order to change the time and/or date that is displayed on the display 120. In some embodiments, the optical encoder of the present disclosure may be used to detect a starting position of the crown 140, the rotational direction of the crown 140 (e.g., clockwise, counterclockwise), and may also detect the speed at which the crown 140 is being rotated. In some cases, the displayed watch hands of the time keeping application may rotate or otherwise move in accordance with the rotational input provided to the crown 140. In some cases, the watch hands move an amount, direction, and/or speed that corresponds to the rotational input provided to the crown 140.

Although omitted from FIG. 1A for clarity, the electronic device 100 may also include various additional components that assist in the overall operation of the device. For example, the electronic device 100 may include one or more sensors, a microphone, a haptic actuator, a battery, a processor, a memory, and various other components. Further, the crown 140 and/or the button 130 may interact with one or more of the components listed to facilitate operation of the electronic device 100.

As shown in FIG. 1A, the electronic device 100 may also include a band 150 that may be used to secure or attach the electronic device 100 to a user. In the present example, the band 150 is attached to the housing 110 via a pin or flexible joint. In some cases, the band 150 is formed from two band straps that are attached to each other via a clasp to secure the device 100 to the wrist of a user. Other attachment mechanisms or components, including, for example, a strap, a lanyard, or other such attachment mechanism may also be used to attach the device 100 to a user.

In some embodiments, electronic device 100 may also include a keyboard or other similar input mechanism. Additionally, the electronic device 100 may include one or more components that enable the electronic device 100 to connect to the Internet and/or access one or more remote databases or storage devices. The electronic device 100 may also enable communication over wireless media such as acoustic, radio frequency (RF), infrared, and other wireless media mediums. Such communication channels may enable the electronic device 100 to remotely connect and communicate with one or more additional devices such as, for example, a laptop computer, tablet computer, mobile telephone, personal digital assistant, portable music player, speakers and/or headphones, and the like.

Figure 1B:
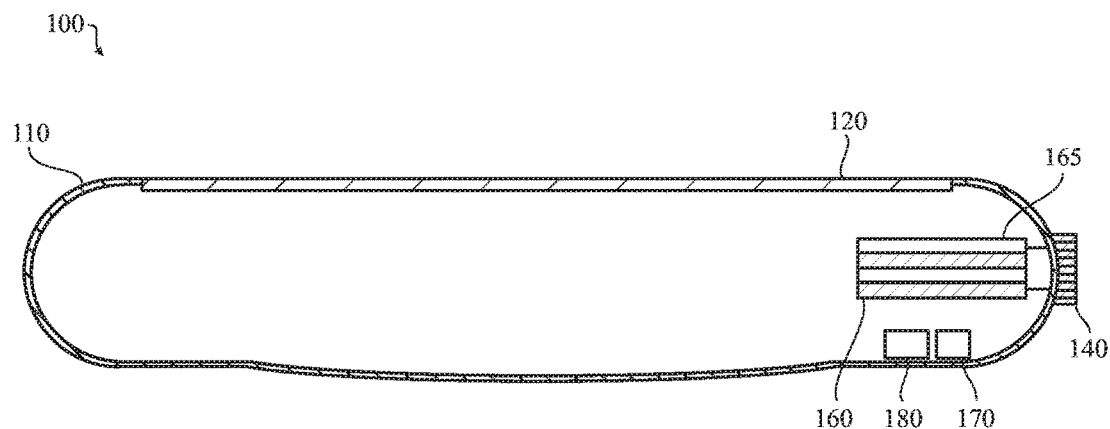
FIG. 1B illustrates a cross-sectional view of the electronic device along Section A-A of FIG. 1A.

FIG. 1B illustrates a cross-sectional view of the electronic device 100 of FIG. 1A according to one or more embodiments of the present disclosure. The scale and relative size of various components depicted in FIG. 1B may be exaggerated to better illustrate certain principles and should not be interpreted as representative of the size of the actual components. As shown in FIG. 1B, the electronic device 100 includes an optical encoder that is operatively coupled to the crown 140. In the present example, the optical encoder includes a spindle 160 (example rotational element), an optical emitter 170, and an optical detector 180. The optical detector 180 may include one or more photodiodes, complimentary metal-oxide semiconductor (CMOS) elements, charge-coupled device (CCD) elements, photovoltaic cell, or other type of photosensor. The optical emitter 170 may be an LED, an infrared light such as, for example a light-emitting diode (LED), an infrared LED, a laser diode, or other type of light source.

In some embodiments, the optical emitter 170 is an infrared (IR) optical emitter, and the encoded pattern 165 disposed on the spindle 160 may be invisible to the human eye but may be detected by the optical detector 180. In some implementations, a first set of (dark) regions of the encoded pattern 165 may be IR-absorptive and a second set of (light) regions of the encoded pattern 165 may be IR-reflective. The optical detector 180 may be configured to detect the IR light reflected off the IR-reflective stripes in order to measure various aspects of the rotation of the spindle 160, as discussed herein.

In some cases, the first and second set of regions of the encoded pattern 165 correspond to regions having different optical properties that can be detected using the optical detector 180. The optical properties may include, but are not limited to, reflective properties, optical diffraction properties, specular or wavelength-dependent properties, and so on. The contrast between the different optical properties between the first and the second set of regions may be used to measure various aspects of the rotation of the spindle 160.

In some embodiments, the optical emitter 170 and the optical detector 180 are axially aligned with respect to the spindle 160. In another embodiment, the optical emitter 170 and the optical detector 180 may be radially aligned with respect to the spindle 160. Although specific alignments are disclosed, in certain embodiments the optical emitter 170 and the optical detector 180 may be aligned with the spindle 160 in any suitable manner so long as light is emitted from the optical emitter 170 interacts with the encoded pattern 165 on the spindle 160 and is received by the optical detector 180.

As shown in the simplified depiction in FIG. 1B, the optical encoder includes a spindle 160 operatively coupled to the crown 140. In the example depicted in FIG. 1B, the spindle 160 is formed as a single piece with the dial of the crown 140. In some embodiments, the spindle 160 may be formed from a separate piece that is attached to the dial of the crown 140 using a threaded connection, adhesive, weld, or other bonding technique. In some cases, the spindle 160 is formed from multiple parts. For example, the spindle 160 may be formed as a hollow cap or sleeve that is inserted over a shaft of the encoder and/or crown 140. Example alternative embodiments are described below with respect to FIGS. 12A and 12B. In general, the spindle 160 is operatively coupled to, or is otherwise a part of the crown 140. In the case of a direct connection, as the crown 140 rotates or moves in a particular direction and at a particular speed, the spindle 160 also rotates or moves in the same direction and with the same speed. In some embodiments, the spindle 160 may be operatively coupled to the crown 140 via a geared, clutched, or other mechanical connection that relates the motion of the various elements.

Depending on the use of the spindle 160, the length of the spindle 160 may vary between embodiments. For example, in some embodiments, the length of the spindle 160 may extend along a length or width of the housing 110. In another embodiment, the spindle 160 may have a length that is substantially less than a length or width of the housing 110.

As shown in FIG. 1B, the spindle 160 of the optical encoder includes an encoded pattern 165. In some embodiments, the encoded pattern 165 may be used to determine positional information about the spindle 160 including rotational movement, angular displacement, rate of movement, change in rate of movement, and so on. In some cases, the encoded pattern 165 may be used to determine absolute position of the spindle 160 due to the unique signal produced by light reflecting off or otherwise produced using the encoded pattern 165.

In the example depicted in FIG. 1B, the encoded pattern 165 is formed from an array of contrasting or optically distinguishable regions formed on the outer surface of the spindle 160. As a simplified example, the encoded pattern 165 depicted in FIG. 1B is depicted as an array of light stripes interspersed with an array of dark stripes. Although light stripes and dark stripes are specifically mentioned and shown, the encoded pattern may include various types of regions having various shades, colors, or other optical properties that provide contrasting or optically distinguishable regions. For example, in some implementations, the white stripes may represent substantially reflective regions of the encoded pattern 165, and the black stripes may represent substantially non-reflective or absorptive regions of the encoded pattern 165. In some embodiments, a first stripe of the encoded pattern may create a substantially specular reflection while a second stripe of the encoded pattern may create a substantially diffuse reflection or otherwise absorb light produced by the optical emitter 170.

In some embodiments, the contrasting or alternating regions of the encoded pattern 165 may include an array of direction-dependent or anisotropic light-reflecting regions that produces a first type of reflection along a first direction and a second type of reflection along a second direction that is transverse to the first direction. In some implementations, the first type of reflection has a relatively narrow or tight beam spread. In contrast, the second type of reflection may have a relatively wide beam spread that is wider than the first type of reflection. With reference to the example depicted in FIG. 1B, the anisotropic reflecting regions may be represented by the white stripes of the encoded pattern 165. As previously mentioned, direction-dependent reflective regions may be used to create an optical system that is more robust or forgiving of dimensional or geometric variations in the system.

By way of example, as shown in FIG. 1B, light emitted by optical emitter 170 may illuminate a portion of the spindle 160. Light that is reflected off the spindle 160 may be received by the detector 180, which may include an array of photosensors. If the white stripes are formed from an anisotropic reflecting region, the light in a longitudinal plane aligned with the length of the spindle 160 may be reflected in a distributed manner toward the detector 180. Additionally, light that is reflected along a transverse plane that is transverse to the length or axis of the spindle 160 may be reflected in a substantially specular, non-distributed manner. Light that is reflected in a direction between the longitudinal and transverse planes may be partially distributed with specular or directional components.

When the light that is reflected off the spindle 160 and received by the optical detector 180, a determination may be made as to the position and movement of the spindle 160, as described in more detail below. In some embodiments, a diffraction-like or characteristic reflected pattern is produced by the encoded pattern 165. Based on the characteristic reflected light or pattern, the optical detector 180 may be used to determine the absolute position, movement, and direction of movement of the spindle 160.

The encoded pattern 165 is generally disposed along the outside surface of the spindle 160 and may include a variety of configurations. In some embodiments, the regions (e.g., stripes) of the encoded pattern 165 extend axially or along the length of the spindle 160. In the embodiment depicted in FIG. 1B, the encoded pattern 165 includes an axial component. For example, the regions may extend along the entire length of the spindle 160 or partially along a length of the spindle 160. In some embodiments, the encoded pattern 165 may include a radial component. For example, the encoded pattern 165 may vary down the length of the spindle 160, which may provide additional positional information. In some embodiments, the encoded pattern may have both a radial component and an axial component.

Whether the encoded pattern 165 includes radial and/or axial components, the encoded pattern 165 may be disposed around the entire circumference of the spindle 160. In some embodiments, the encoded pattern 165 may be disposed only on certain areas of the spindle 160. For example, if a spindle 160 was configured to have partial rotational movement about an axis in a given direction (instead of full rotational movement about the axis such as described herein), the encoded pattern 165 may only be disposed on a portion of the spindle 160 that would be visible to the optical detector 180 as the spindle 160 is rotated.

In some embodiments, the light and dark regions of the encoded pattern 165 may alternate between a light stripe and a dark region. In another embodiment, the light regions and the dark regions of the encoded pattern 165 may be interspersed or arranged in a particular sequence. In some embodiments, each of the sequence or arrangement of the encoded pattern 165 may be used to determine an absolute position of the spindle 160.

Figure 2:
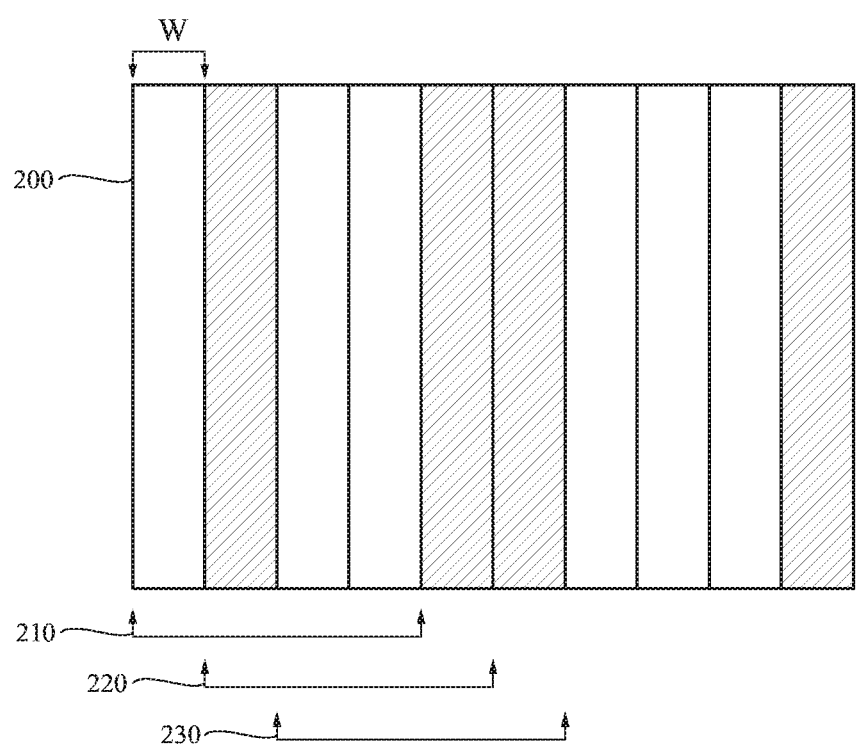
FIG. 2 illustrates an example encoded pattern of an optical encoder.

An example encoded pattern 200 is depicted in FIG. 2. Specifically, FIG. 2 depicts a partial sequence of an encoded pattern 200 having an array of contrasting regions depicted in a flat form factor. (The actual encoded pattern 200 may be wrapped around the surface of a spindle.) The encoded pattern 200 includes interspersed contrasting regions that are represented by light and dark stripes. As discussed above, the light and dark stripes may correspond to reflective and non-reflective regions. In some cases, the reflective regions are direction-dependent or anisotropic reflecting regions. The example encoded pattern 200 may have a non-repeating sequence of light and dark stripes which may be used to determine absolute position or location within the sequence. In the example depicted in FIG. 2, the encoded pattern includes regions or stripes arranged as follows: light, dark, light, light, dark, dark, light, light, light, dark.

In this simplified example, four stripes, in combination, may represent a four-bit pattern that is associated with a position of the spindle. Specifically, in the example shown in FIG. 2, the sub-pattern 210 includes stripes in the following order: light, dark, light, light, the sub-pattern 220 includes stripes in the following order: dark, light, light, dark, the sub-pattern 230 includes the following stripes: light, light, dark, dark, and so on. Because the encoded pattern 200 is non-repeating, each sub-pattern (e.g., sub-patterns 210, 220, and 230) may indicate an absolute (rotational) position of the spindle of the encoder.

In some cases, the absolute position within the encoded pattern 200 may be used to determine a direction of movement of the spindle. For example, if the optical detector views sub-pattern 220 at a first time and subsequently views sub-pattern 210 at a second time, a determination may be made that the spindle is moving to the right, which may correspond to a counter-clockwise rotational direction. Similarly, if the optical detector views sub-pattern 220 followed by sub-pattern 230, a determination may be made that the spindle is rotating in a clockwise direction.

In some embodiments, the shading or color of each stripe may vary within the encoded pattern 200. In some embodiments, the amount of reflection or other optical property of the interspersed regions may be varied. Various combinations of spatial and optical variations may be used to encode positional information within the pattern. Although FIG. 2 illustrates an encoded pattern 200 in which the stripes themselves are arranged in a particular order, in alternative embodiments the stripes of the encoded pattern may directly alternate between a light stripe and a dark stripe.

As also shown in FIG. 2, each stripe of the encoded pattern 200 may have a width W. In some embodiments, the width W of each of the stripes on the encoded pattern 200 may be uniform or substantially uniform. Accordingly, in embodiments where the stripes are arranged as alternating light and dark stripes, the uniformity of the stripes of the encoded pattern 200 may facilitate the determination of an amount of rotation of the spindle. For example, a count of the regions or stripes that pass the optical detector may be multiplied by the width W and used to determine an amount of rotation.

In another embodiment, the width W of each stripe of the encoded pattern 200 may vary. For example, each of the light stripes of the encoded pattern 200 may have a first width while each of the dark markings of the encoded pattern 200 may have a second, different width. In another example, a first stripe of the encoded pattern 200 may have a first width, a second stripe of the encoded pattern 200 may have a second width, and a third stripe of the encoded pattern 200 may have a third width. Such an arrangement may enable a computing device, such as, for example, computing device 100 to measure a position of the spindle 160 based on the various widths of the stripes. The variable width of each of the stripes may be used in any of the encoded patterns discussed herein. For example, stripes having variable widths may be used in encoded patterns in which the order of the stripes vary, such as shown in FIG. 2, or in embodiments where the stripes of the encoded pattern alternate between light and dark stripes.

In another example, the varying widths of the stripes may provide a pattern that indicates an absolute position of the spindle. For example, a stripe having a first width may indicate that the spindle is in a first position, while a stripe having a second width may indicate the spindle is in a second position. In still yet another example, each stripe may have a tapered width, which may be used to determine linear movement of the spindle as well as rotational movement of the spindle.

The stripes of the encoded pattern 200 may also include a variety of multi-dimensional patterns. For example, the regions of the encoded pattern 200 may be arranged in a 2-dimensional code, Quick Response (QR) code, a bar code or other such pattern that may be used to encode positional information on the surface of the spindle 160, which may be used to determine a rotational, translational, or angular movement of the spindle 160 as well as the movement speed of the spindle 160.

Referring back to FIG. 1B, the optical encoder of the present disclosure includes an optical detector 180, which is used to distinguish between contrasting or optically distinguishable regions formed on the surface of the spindle 160. In general, the optical detector 180 may be configured to produce an electrical output that corresponds to the amount of light received by a photo-sensitive surface of the optical detector 180. The regions may be detected based on the intensity or amount of reflected light that is then received by the optical detector 180, which may produce a corresponding amount of output current or other electrical signal.

In some implementations, the optical detector 180 includes a photodiode that produces an analog current in response to an amount of light incident on the surface of the photodiode. In some cases, the higher the output current output from the photodiode, a greater portion of the light stripe, or the reflective stripe, is apparent to the optical detector 180 (or apparent to a particular photodiode of the optical detector 180). Likewise, in some cases, the smaller the output current that is produced by the photodiode, the greater portion of the dark stripe, or non-reflective surface, may be apparent to optical detector 180 (or apparent to a particular photodiode of the optical detector 180).

Using the output of the optical detector 180, rotational information of the spindle 160, and ultimately the crown 140 may be determined. For example, rotational data may be derived from analyzing the outputs of an array of photodiodes in the optical detector 180 across one or more sample frames. The variance of the outputs or phase between the sample frames is related to the motion or rotational direction of the stripes of the encoded pattern 165 and ultimately the spindle 160.

Figure 3A:
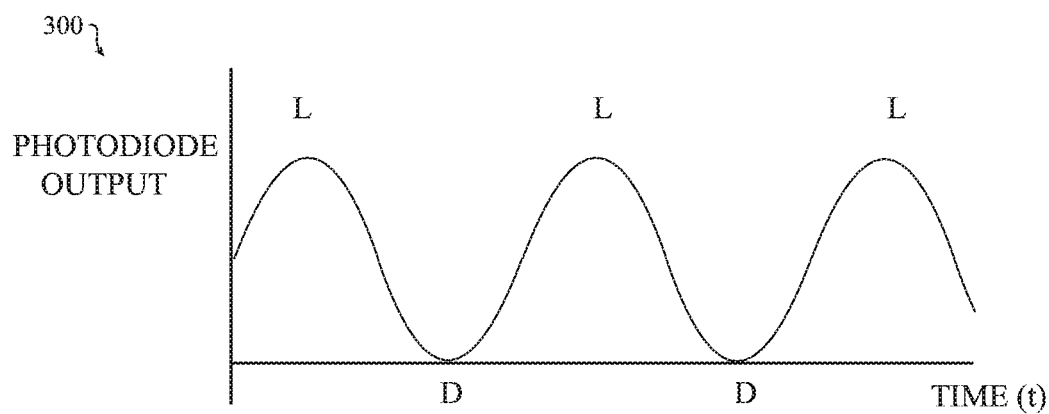
FIGS. 3A-3C illustrate example current output graphs of a photodiode array.
Figure 3B:
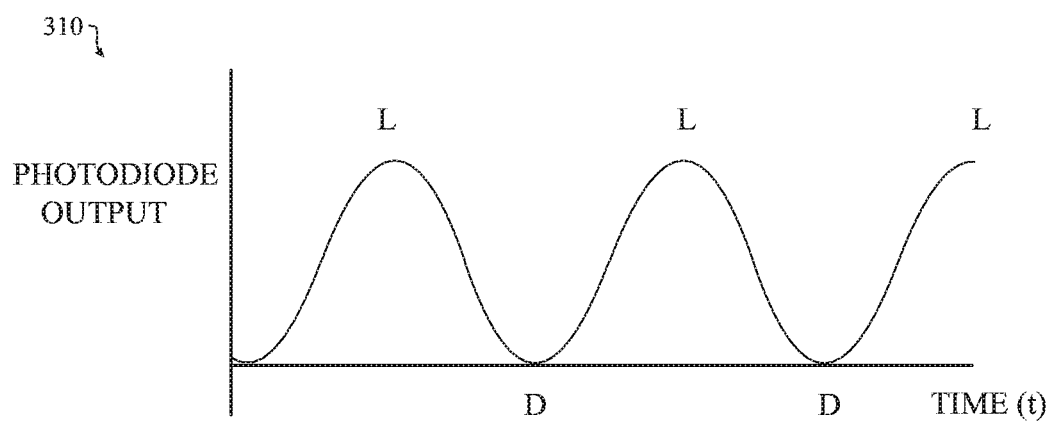
Figure 3C:
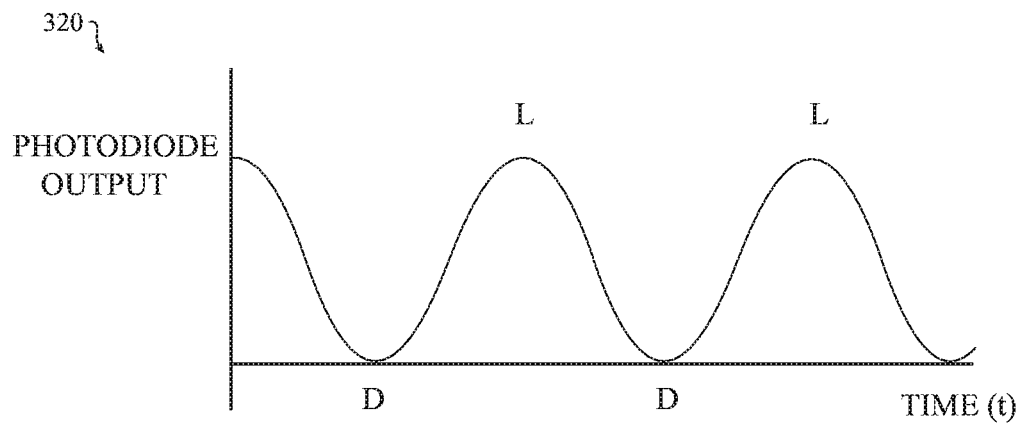

FIGS. 3A-3C show example current output graphs provided by an array of photodiodes of an example optical detector. For example, each graph 300, 310, and 320 may represent output provided by an different photodiode of the optical detector as it receives light that is reflected off of an encoded pattern. While photodiodes are discussed with respect to this example, as discussed above, the sensor that is used to detect movement of the spindle of the optical encoder may be any type of photo-sensitive or light detecting sensor.

In one simplified example, the light and dark regions of the encoded pattern are directly alternating, equally spaced stripes disposed around the outer surface of a round spindle. In this case, the graph 300 shown in FIG. 3A may represent output of a first photodiode over a time t. Similarly, graphs 310 and 320 may represent the output of a second and third photodiode over the same time t. By comparing the phase shift of the current output of the various photodiodes, the direction of rotation (e.g., clockwise or counterclockwise) may be determined. Additionally, the amount of rotation may be determined based on the number of peaks (or some other reference point) that have passed by a particular photodiode. Also, the rate of rotation may be determined based on the frequency or rate of the current peaks that are detected by one or more of the photodiodes. In some cases, if the encoded pattern includes a non-repeating sequence, the spacing between the peaks, representing the center of light-reflecting or light regions, may be used to determine an absolute location within the encoded pattern. An example non-repeating sequence is discussed above with respect to FIG. 2.

Although the examples above have been given with respect a length-wise or radial component that is used determine aspects of the rotational movement, in some embodiments, the same principles may also be used to detect linear or translational movement of the spindle. For example, the encoded pattern may include one or more regions that vary along the length of the spindle, which may be referred to as an axial component. In some cases, the axial component of the encoded pattern may be used to detect a user pushing the crown toward the housing or pulling the crown away from the housing. In some embodiments, the principles described above may be used to determine both a rotational and a translational movement of the spindle.

Figure 4A:
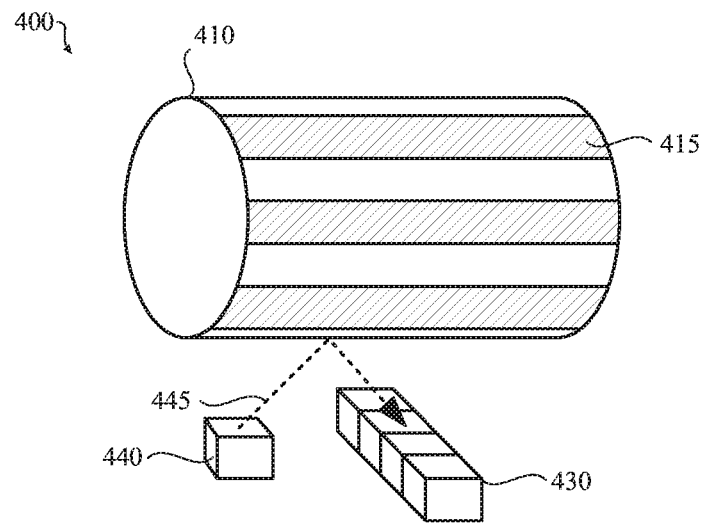
FIGS. 4A-4B illustrate an optical encoder having components arranged along the length of a spindle.
Figure 4B:
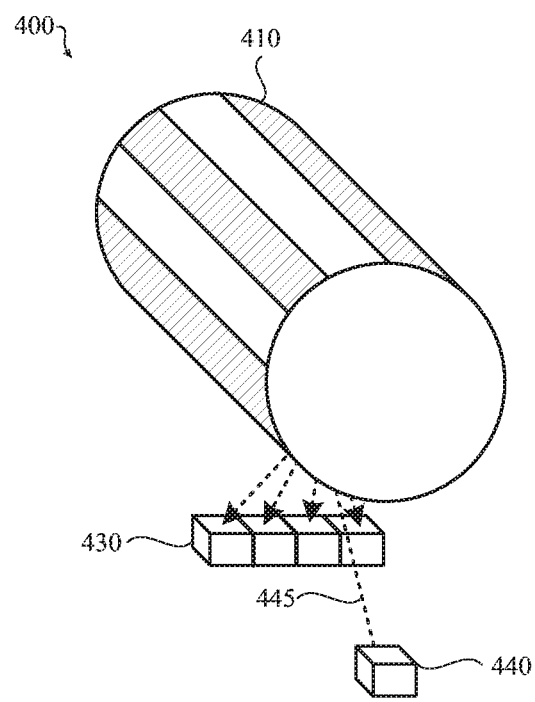

FIGS. 4A-4B illustrate an optical encoder 400 having components of an optical sensor axially or length-wise aligned with respect to the spindle 410 of the optical encoder 400 according to one or more embodiments of the present disclosure. FIGS. 4A-4B depict two different perspective views of the same optical encoder 400. In some embodiments, the optical encoder 400 may be similar to the optical encoder shown and described with respect to FIG. 1B.

As shown in FIGS. 4A-4B, the optical encoder 400 includes a spindle 410, an optical emitter 440, and an optical detector that includes a photodiode array 430. The spindle 410 includes an encoded pattern 415 formed on the outer surface. The encoded pattern 415 may include an array of optically contrasting regions, such as an array of interspersed stripes having different optical properties. As shown in FIGS. 4A-4B, the stripes of the encoded pattern 415 are axially aligned with respect to the spindle 410 and are arranged circumferentially around the spindle 410. In accordance with the examples described herein, the encoded pattern 415 may be used to determine aspects of the rotational movement of the spindle 410.

In some embodiments, the light regions or stripes of the encoded pattern 415 may be substantially reflective, and the dark regions or stripes of the encoded pattern 415 may be substantially non-reflective. In some cases, the light regions are formed as anisotropic reflecting regions that reflect light in a narrowly distributed fashion in a direction perpendicular to the axis of the spindle 410 and reflect light in a more widely distributed fashion in a direction aligned with the axis of the spindle.

As shown in FIGS. 4A-4B, the optical encoder 400 may include an optical emitter 440 that is aligned with the photodiode array 430 along the length or axis of rotation of the spindle 410. Further, the optical emitter 440 may be described as being aligned along the length or the axis of rotation of the spindle 410. The sensor arrangement depicted in FIGS. 4A-4B may result in a spindle 410 that is longer than the alternative arrangements, such as the embodiment depicted in FIGS. 5A-B and described below. In some cases, the length of the spindle 410 is sufficient to enable the light 445 from the optical emitter 440 to be reflected off the spindle 410 and received by the photodiode array 430. Although the length of the spindle 410 may be increased as compared to other configurations, the configuration may be more optically efficient. For example, the axial alignment of the optical emitter 440 and the photodiode array 430 may increase the amount of light that is reflected back to the photodiode array 430, which, in some implementations, may improve the accuracy of rotation data and/or the power required to illuminate the spindle 410.

Although four photodiodes are specifically shown and described in the photodiode array 430, any number of photodiodes may be used. The number of photodiodes may increase or decrease depending on the size of the collection area of each of the photodiodes and/or the size of various other aspects of the optical system of the encoder. In some cases, an accurate rotational or linear movement of the spindle 410 may be collected from an array of two photodiodes. In other embodiments, eight or more photodiodes may be required. In another embodiment, multiple arrays of photodiodes may be used. Further, each of photodiode arrays may be arranged in various alignments and positions with respect to the spindle 410.

Figure 5A:
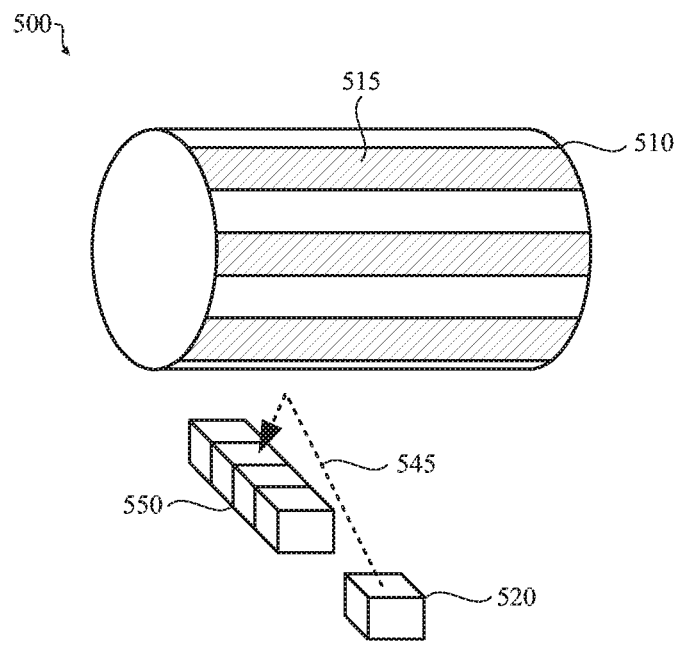
FIGS. 5A-5B illustrate an optical encoder having components arranged transverse with respect to the length of a spindle.
Figure 5B:
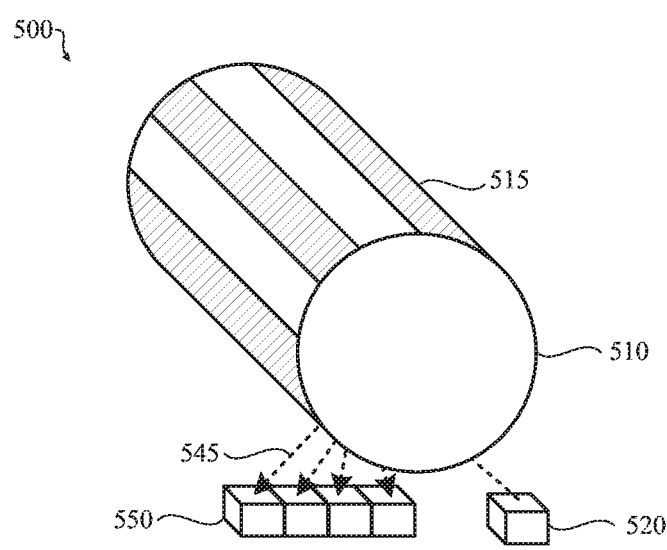

FIGS. 5A-5B depict an alternative arrangement of an optical sensor in an optical encoder 500. In particular, FIGS. 5A-5B depict an optical encoder 500 having components of an optical sensor radially aligned with respect to the spindle 510 of the optical encoder. In some embodiments, the optical encoder 500 may be similar to the optical encoder shown and described with respect to FIG. 1B.

As shown in FIG. 5A, the optical encoder 500 includes a spindle 510, an optical emitter 520 and an optical detector that includes a photodiode array 550. As depicted in FIG. 5A and FIG. 5B, the photodiode array 550 may include four photodiodes. However, any number of photodiodes may be used for the array 550 depending on the size of the collection area of each of the photodiodes and other aspects of the encoder 500, such as described above. Also as shown in FIG. 5A, the stripes of the encoded pattern 515 are axially aligned with respect to the spindle 510 and are arranged around a circumference of the spindle 510. In accordance with embodiments described herein, detecting reflected light from the encoded pattern 515 may be used to determine aspects of the rotational movement the spindle 510.

As shown in FIG. 5A, the optical encoder 500 may include an optical emitter 520 and a photodiode array 550 that are radially aligned with respect to the spindle 510. For example, the optical emitter 520 and the photodiode array 550 may be aligned with each other such that the reflected beam 545 is transverse to (e.g., perpendicular) to the axis of rotation of the spindle 510. In some embodiments, the radial alignment of the optical emitter 520 and photodiode array 550 with respect to the spindle 510 may enable the spindle 510 to be shorter than the embodiments shown in FIGS. 4A-4B.

In general, the encoder configurations described above with respect to FIGS. 4A, 4B, 5A, and 5B may be incorporated into compact form factors, such as a wearable or wrist-worn electronic device. In some implementations, it may be beneficial for the encoder to also include one or more direction-dependent, optically anisotropic, or anisotropic reflecting regions on the spindle of the encoder to improve the encoder's ability to tolerate dimensional variations due to normal variability in manufacturing processes, manufacturing tolerances, and movement of components within the system. In general, an optically anisotropic region may allow for dimensional variations within the encoder that may otherwise result in misalignment of the optical elements of the encoder.

Figure 6A:
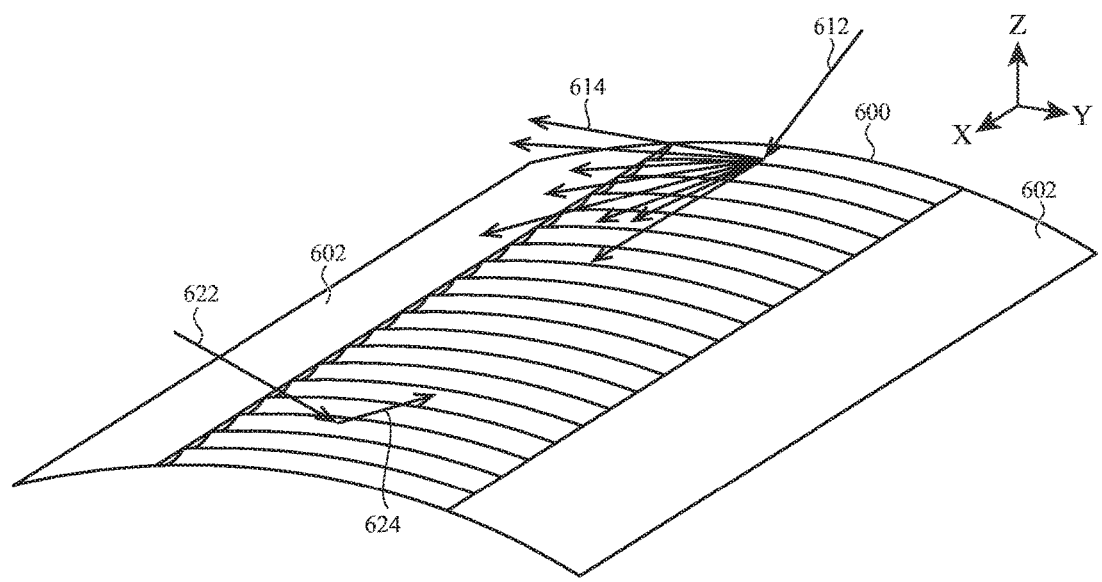
FIG. 6A illustrates a surface having an example optically anisotropic region on a surface.

FIG. 6A depicts an example direction-dependent or anisotropic region 600 that may be formed on the outer surface of a spindle. In the example of FIG. 6, the anisotropic region 600 includes an array of shallow grooves that are formed into the surface of the spindle. The anisotropic region 600 may be bounded by or adjacent one or more non-reflective or diffuse regions 602 that are optically contrasting or optically distinguishable from the anisotropic region 600. Examples of optically anisotropic regions that are interspersed with non-reflective or contrasting regions are described below with respect to FIGS. 7A-7D.

As shown in FIG. 6A, the anisotropic region 600 reflects light differently depending on the direction of the light incident on the surface of the region 600. In particular, light that is generally traveling in the X-Z plane may be reflected in a substantially distributed or widely spread manner. In some cases, the light traveling in the X-Z plane is characterized as having a first type of reflection having a first beam spread. The reflective properties of light traveling in the X-Z plane may be different than light that is generally traveling in the Y-Z plane, which may be reflected as in a less distributed or narrowly spread manner. In some cases, the light traveling in the Y-Z plane is characterized as having a second type of reflection having a second beam spread that may be narrower or less distributed than the first beam spread. In some cases, the X-Z plane represents a plane that is parallel to or passes through the central or axis of rotation of the spindle. In some cases, the Y-Z plane represents a plane that is transverse to (e.g., perpendicular to) the central or axis of rotation of the spindle.

Figure 6B:
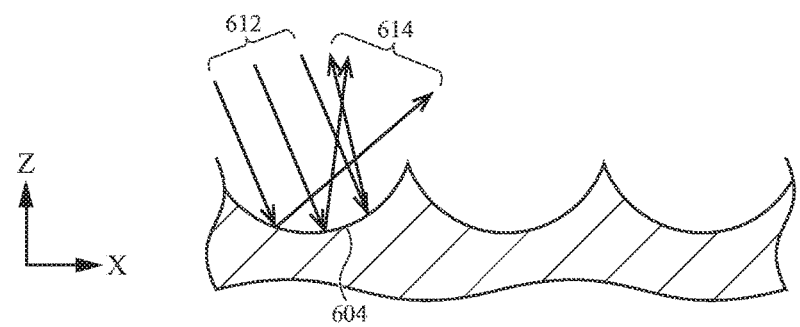
FIG. 6B illustrates a detail view of the optically anisotropic region along a plane that is parallel with the axis of the spindle.
Figure 6C:
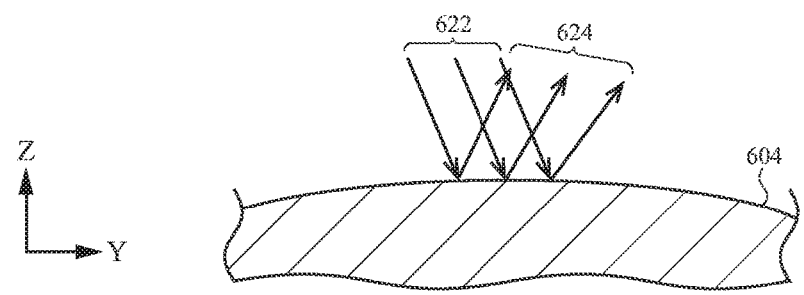
FIG. 6C illustrates a detail view of the optically anisotropic region along a plane that is transverse to the axis of the spindle.

FIG. 6A depicts a simplified example of the direction-dependent nature of the reflection created over the anisotropic region 600. For purposes of illustration, a quantity of light, such as a beam, is represented by an arrow or group of arrows even though the quantity of light may actually include multiple rays. The arrows depicted in FIG. 6A represent the general direction of the multiple rays that make up the beam. FIGS. 6B and 6C depict detail views that better illustrate the interaction between rays of light and the groove features formed into the surface of the anisotropic region 600.

As shown in FIG. 6A, an example light beam 612 may represent a collection of light rays that are produced by the optical emitter of the optical encoder having the same general (parallel) orientation as indicated by the direction of the arrow. For a light beam 612 having light rays that are substantially aligned with the X-Z plane, the reflection will result in a reflected light beam 614 having a distributed, diffused, or widened beam spread. In some cases, the reflected light beam 614 includes multiple rays of light that propagate over a range of reflected light path angles. In some cases, the reflected light beam 614 includes a specular or directional component, but has wider spread than the incoming light beam 612.

FIG. 6B depicts a detail view of the interaction of the incoming light beam 612 with a groove 604 formed in the anisotropic region 600. As shown in FIG. 6B, the incoming light beam 612 is comprised of multiple light rays that are generally parallel or aligned with each other. The angle of incidence of each ray is different on the surface of the region due to the curved shape of the groove 604. Because each ray of the beam 612 has a different angle of incidence, the resulting reflected beam 614 will include rays that are greatly diverging as compared to the rays of the incoming light beam 612. The reflected light beam 614 may be characterized as having a broader spread or distributed over a wider range of angles as compared to light beam 612. In some cases, the reflected light beam 614 may be described as being diffused by the grooves 604 of the anisotropic region 600.

FIG. 6A also depicts another example light beam 622 that may be produced by the optical emitter of the optical encoder. Because the light ray 622 is substantially aligned to the Y-Z plane, the reflection may result in a reflected light beam 624 that has a substantially non-distributed or relatively narrow beam spread.

FIG. 6C depicts a detail view of the interaction of the incoming light beam 622 with, for example, a bottom portion of the groove 604 formed in the anisotropic region 600. As shown in FIG. 6C, the incoming light beam 622 is comprised of multiple light rays that are generally parallel or aligned with each other. The angle of incidence of each ray varies only slightly over the bottom portion of the groove 604 because the curvature of the groove is much lower in the Y-Z plane. Because each ray of the beam 622 has a only a slightly different angle of incidence, the resulting reflected beam 624 will include rays that are only slightly diverging as compared to the rays of the incoming light beam 622. The reflected light beam 624 may be characterized as having a similar or only slightly diverging output as compared to light beam 612. In some cases, the reflected light beam 624 may be described as having a specular or non-diverging reflection.

Due to the direction-dependent nature of the optically anisotropic region 600, light will reflect differently depending on the general direction of the incoming or incident light. With reference to FIGS. 6A-6C, the reflected light beam 624 oriented along the Y-Z plane can be characterized as being more narrowly distributed, having a more narrow beam angle, or more directed as compared to reflected light beam 614 oriented along the X-Z plane. Conversely, the reflected light beam 614 can be characterized as being more widely distributed, having a wider beam angle, or less directed as compared to reflected light beam 624.

Figure 7A:
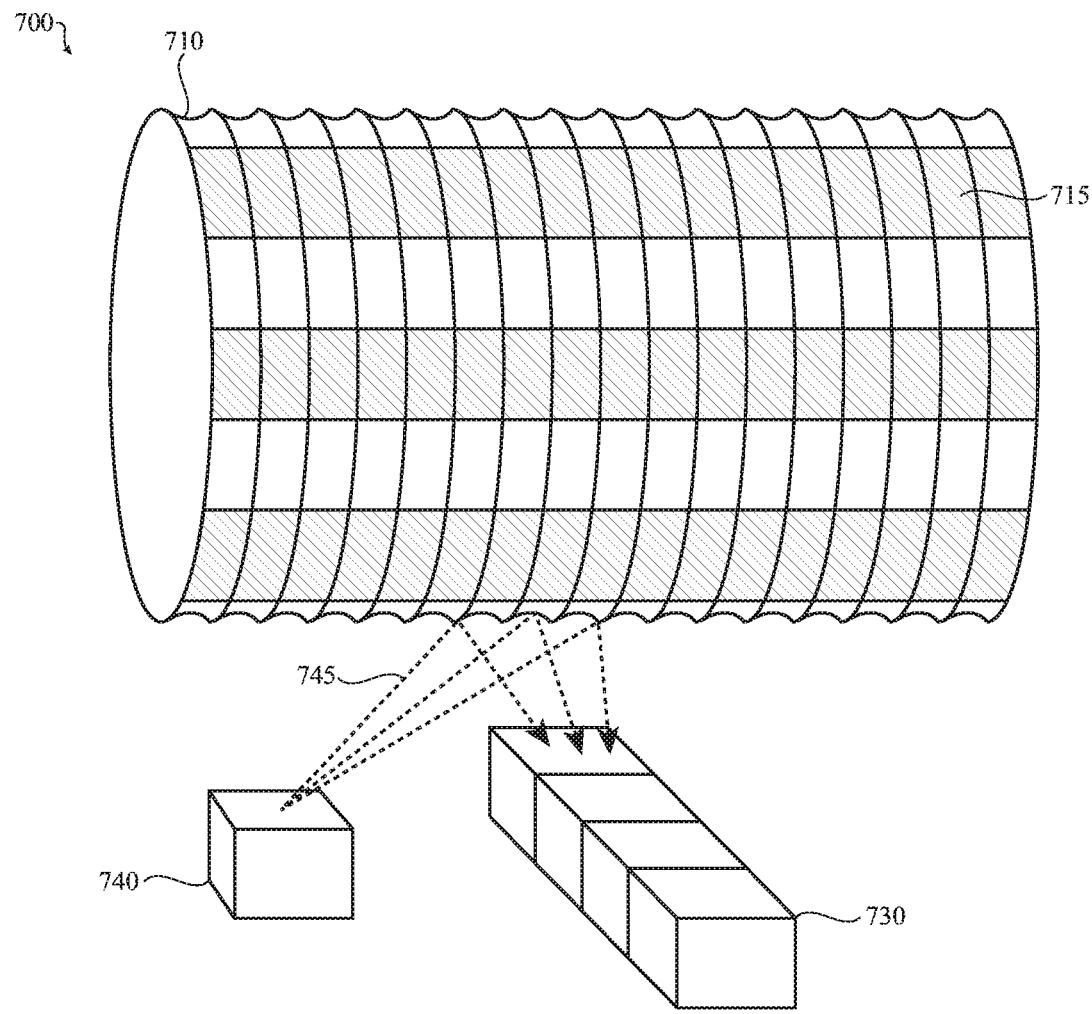
FIGS. 7A-7D illustrate an optical encoder having reflective regions with contoured features formed around an outward-facing surface of the spindle.

In the examples of FIGS. 6A-6C, the optically anisotropic region 600 is formed from a series of concave-shaped features or cuts, as described in more detail with respect to FIG. 7A. In alternative embodiments, the optically anisotropic region 600 may be formed from a series of convex-shaped features, as described in more detail with respect to FIG. 7B. In another alternative embodiment, the optically anisotropic region 600 may be formed from a different surface feature or surface finish that produces a direction-dependent or optically anisotropic properties, similar to as described above. For example, the optically anisotropic region 600 may include a combination of concave and convex features.

FIGS. 7A-7D depict example optical encoders 700, 750, 770, 780 having a set of optically anisotropic or anisotropic reflecting regions interspersed with a set of non-reflective regions. The details and operation of the optical encoders 700, 750, 770, 780 may be similar to the examples described above with respect to any of the previous figures. In particular, the encoders 700, 750, 770, 780 may be incorporated with a crown of an electronic device. Also, while the encoders 700, 750, 770, 780 depict a sensor arrangement similar to the arrangement depicted in FIGS. 4A and 4B, in alternative embodiments, the sensor arrangement may also be similar to the arrangements depicted in FIGS. 5A and 5B.

FIG. 7A illustrates an optical encoder 700 having anisotropic reflecting regions with a series of concave-shaped features formed around the surface of the spindle 710. As described above with respect to FIGS. 6A-6C, a series of concave-shaped features may result in direction-dependent reflective properties for the reflective regions. In some embodiments, the anisotropic reflecting regions, represented by the light or white stripes of the encoded pattern 715, may distribute a wider reflected light distribution, which may improve the reliability of the optical encoder. In some cases, the anisotropic reflecting regions may improve the operability of the optical encoder 700 that may experience one or more dimensional variations that affect the optical system. For example, the anisotropic reflecting regions may reduce the encoder's 700 sensitivity to variations in the distance between the spindle 710 and the optical emitter 740 and/or the optical detector 730. The anisotropic reflecting regions may also reduce sensitivity to axial misalignment of the spindle 710 with respect to the optical emitter 740 and/or the optical detector 730. The anisotropic reflecting regions may also reduce sensitivity to normal manufacturing tolerances of the components, including, for example, the diameter of the spindle 710, the roundness of the spindle 710, and the like.

In general, the optical emitter 740 may be configured to illuminate a portion of the spindle 710 with light beam 745. The optical detector 730 may be configured to receive light from the illuminated portion of the spindle 710. The encoded pattern 715 may include an array of contrasting regions formed on an outward-facing surface of the spindle 710.

As shown in FIG. 7A, an emitted light beam 745 produced by the optical emitter 740 may be reflected by the anisotropic reflecting regions in a substantially distributed manner having wider-beam spread over the optical detector 730, which may include an array of photodiodes. The wider or increased light distribution, as compared to a pure specular reflection, may help to ensure that at least some of the reflected light will reach the optical detector 730, even when there are dimensional variations within or between the components of the optical encoder 700. Additionally, the anisotropic reflecting regions may produce a reflection having a less distributed or narrower-beam spread in a direction perpendicular to the length or rotational axis of the spindle 710. This may reduce the amount of light that is spread or reflected across the array of photodiodes of the optical detector 730, which may improve or maintain the optical contrast between reflective and non-reflective regions of the encoded pattern 715. In some embodiments, each anisotropic reflecting region is configured to produce a reflection having a narrow reflected-light distribution for light along a transverse plane that is perpendicular to a central axis of the spindle 710 and produce a reflection having a wider reflected-light distribution for light along a longitudinal plane that passes through the central axis of the spindle 710.

Similar to previous examples, the (anisotropic) reflective regions may be interspersed (e.g., alternated) with dark, diffuse, non-reflective, or optically-absorptive regions to form an array of contrasting or optically distinguishable regions. Also, similar to previous examples, the array of contrasting or optically distinguishable regions may extend along the length of the spindle 710. While the simplified example depicted in FIG. 7A shows the reflective and non-reflective or optically absorptive regions as alternating, various non-repeating patterns of regions may also be used to produce the encoded pattern 715 similar to the examples described above with respect to FIGS. 2 and 3A-3C.

In some embodiments, the concave features of the anisotropic reflecting regions are formed by turning a semi-circular groove that encircles the outer surface of the spindle 710. The concave features may be formed, for example, by cutting the outer surface of the spindle 710 with a contoured or curved cutting tool using a lathe or similar machining apparatus. In some embodiments, the concave features are formed as a continuous spiral encircling the outer surface of the spindle 710. Alternatively, the concave features may be formed as separate rings that encircle the outer surface of the spindle 710. In some embodiments, the concave features are cut using a computer numerically controlled (CNC) machine to help maintain the consistency and accuracy of the concave cuts. In some embodiments, the concave features are formed into the surface of the spindle 710 using a molding, casting, forging, or other similar process. In some implementations, the spindle 710 is formed as a separate part that is disposed about a shaft in communication with other components of a user-input device, such as the dial of a crown.

The radius and depth of the concave features may be configured to produce a particular reflected light distribution. In some cases, if the light distribution is too wide, the amount of light that is actually incident on the optical detector 730 may be too low for a reliable measurement. Conversely, if the light distribution is too narrow, the optical encoder 700 may be too sensitive to dimensional variations between and/or within the components of the optical encoder 700. In some cases, the ratio of the radius to depth of the cut may be configured to produce a desired reflected-light distribution. By way of example and not limitation, the ratio of the radius to the depth of the concave feature may be equal to or greater than a minimum ratio of 7:1 and may be equal to or less than a maximum ratio of 13:1. By way of further example and not limitation, the concave cut may have a depth as small as 3 microns or a depth as large as 15 microns. In some cases, the depth is less than 3 microns or greater than 15 microns.

In the present example, the dark, non-reflective, or optically-absorptive regions interspersed with the light or reflective regions are formed by coating the respective regions of the spindle 710 with a dark, optically-absorptive, diffuse, or non-reflective coating. In some cases, the dark, optically-absorptive, diffuse, or non-reflective regions are formed by disposing an ink or coating over the stripe-shaped regions arranged along the length of the spindle 710. In some embodiments, the dark, optically-absorptive, diffuse, or non-reflective regions are formed by laser etching or ablating the regions to form a substantially flattened region or surface. In some embodiments, the dark, non-reflective, or optically-absorptive regions are laser ablated and then coated with an ink or other coating to reduce the optical reflective properties of the area. The dark, non-reflective, or optically-absorptive regions may also be machined, ground, or similarly processed to alter the surface reflective properties of the respective regions.

Figure 7B:
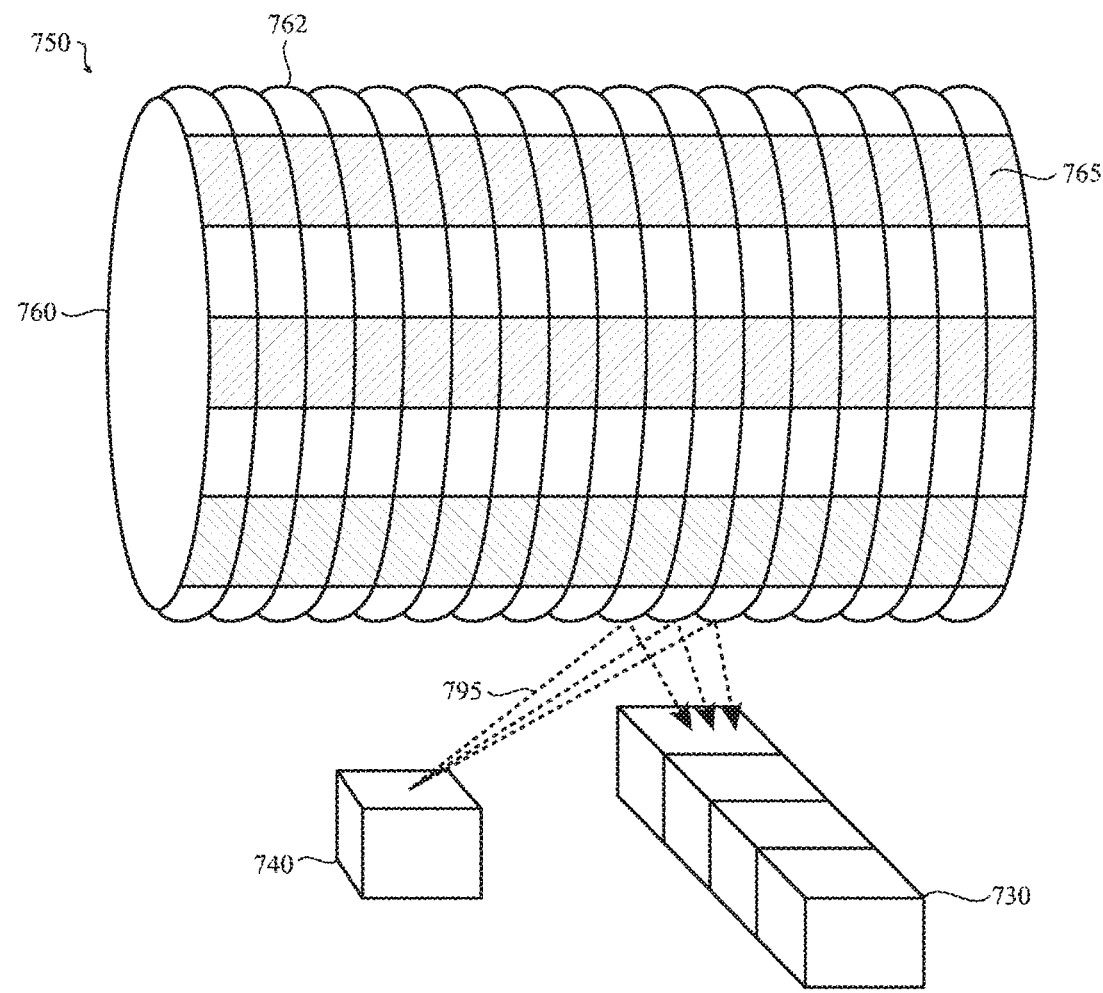

The anisotropic reflecting regions may be formed using other geometry or surface treatments. For example, FIG. 7B illustrates an optical encoder 750 having anisotropic reflecting regions with a series of convex-shaped features formed around the surface of the spindle 760. Similar to as described above with respect to FIGS. 6A-6C, a series of contoured features may result in direction-dependent reflective properties of the reflective regions. Similar to the previous example, the anisotropic reflecting regions, represented by the light or white stripes of the encoded pattern 765, may distribute a wider reflected light distribution, which may improve the reliability of the optical encoder by reducing the encoder's sensitivity to dimensional variation between the components or within the components themselves.

As shown in FIG. 7B, an emitted light beam 795 produced by the optical emitter 740 may be reflected by the anisotropic reflecting regions in a substantially distributed manner having wider-beam spread over the optical detector 730, which may include an array of photodiodes. As described above, the wider or increased light distribution, as compared to a pure specular reflection, may help to ensure that at least some of the reflected light will reach the optical detector 730, even when there are dimensional variations within or between the components of the optical encoder 750. Additionally, the anisotropic reflecting regions may produce a reflection having a less distributed or narrower-beam spread in a direction perpendicular to the length or rotational axis of the spindle 760, which may reduce the amount of light that is spread across the array of photodiodes of the optical detector 730 to improve or maintain the optical contrast between reflective and non-reflective regions of the encoded pattern 765. In some embodiments, each anisotropic reflecting region is configured to produce a reflection having a narrow reflected-light distribution for light along a transverse plane that is perpendicular to a central axis of the spindle 760 and produce a reflection having a wider reflected-light distribution for light along a longitudinal plane that passes through the central axis of the spindle 760.

Similar to previous examples, the (anisotropic) reflective regions may be interspersed (e.g., alternated) with dark, diffuse, non-reflective, or optically-absorptive regions to form an array of contrasting or optically distinguishable regions. Also, similar to previous examples, the array of contrasting or optically distinguishable regions may extend along the length of the spindle 760. While the simplified example depicted in FIG. 7B shows the reflective and non-reflective or optically absorptive regions as alternating, various non-repeating patterns of regions may also be used to produce the encoded pattern 765 similar to the examples described above with respect to FIGS. 2 and 3A-3C.

In some embodiments, the convex features of the anisotropic reflecting regions are formed using a machining process used to cut the features in the outer surface of the spindle 760. In some embodiments, the convex features are formed as a continuous spiral encircling the outer surface of the spindle 760. Alternatively, the convex features may be formed as separate rings that encircle the outer surface of the spindle 760. Additionally or alternatively, the convex features may be formed by molding, casting, forging, or using another similar process to form a portion of the outer surface of the spindle 760. In some implementations, the spindle 760 is formed as a separate part that is disposed about a shaft in communication with other components of a user-input device, such as the dial of a crown.

The radius and height of the convex features may be configured to produce a particular reflected light distribution. In some cases, if the light distribution is too wide, the amount of light that is actually incident on the optical detector 730 may be too low for a reliable measurement. Conversely, if the light distribution is too narrow, the optical encoder 750 may be too sensitive to dimensional variations between and/or within the components of the optical encoder 750. Thus, in some cases, the radius and height and/or the ratio of the radius to the height may be configured to produce the desired diffuse light distribution that is tailored to the dimensions and predicted variations in the components of the encoder 750.

As shown in FIG. 7B, the encoded pattern 765 includes dark, diffuse, non-reflective, or optically-absorptive regions interspersed with the anisotropic reflecting regions. The dark, diffuse, non-reflective, or optically-absorptive regions may be formed using one or more of the techniques described above with respect to FIG. 7A.

Figure 7C:
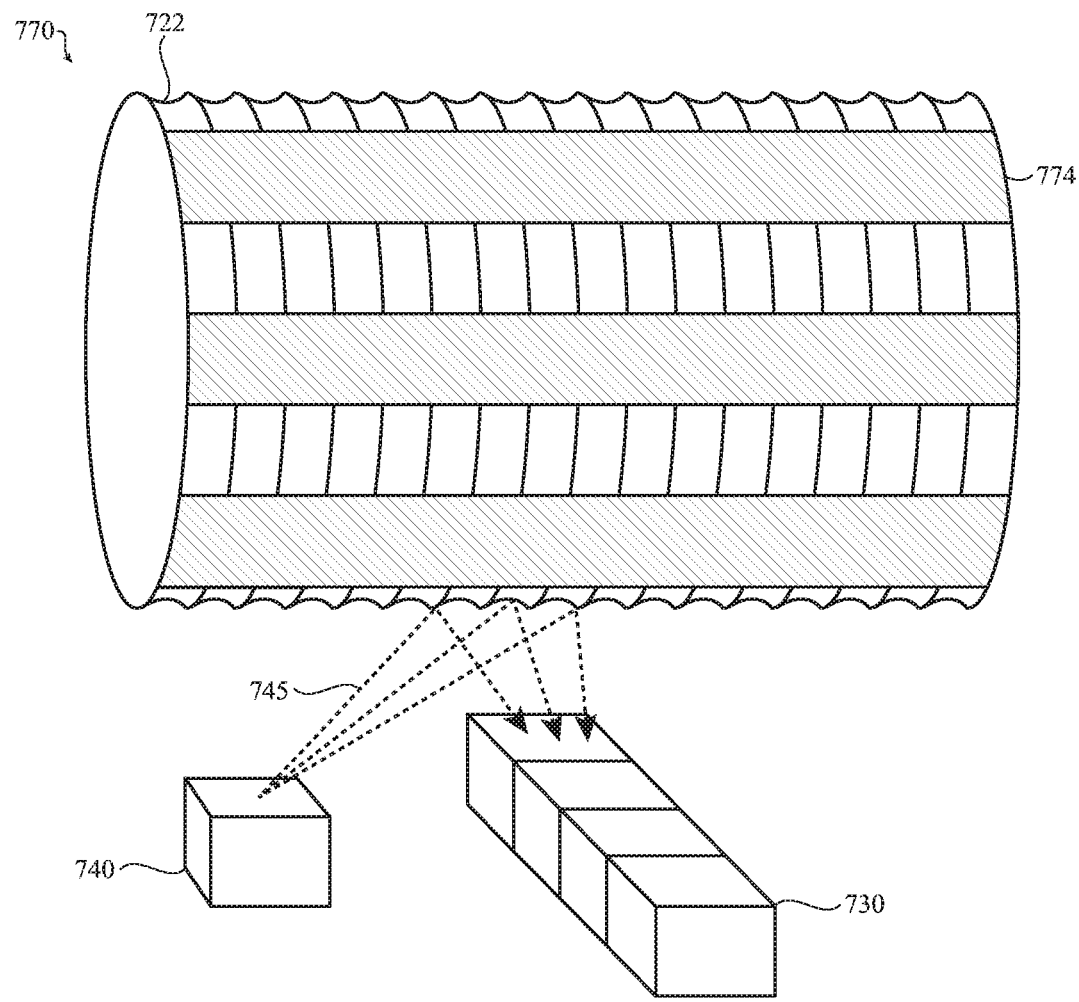

FIG. 7C depicts an example optical encoder 770 including a spindle 772, optical emitter 740, and optical detector 730. Similar to the previous examples, the optical emitter 740 is configured to produce an emitted beam 745 that is reflected off the encoded pattern 774 formed on the outer surface of the spindle 772. In the present embodiments, the encoded pattern 774 includes an array of contrasting regions extending along a length of the spindle 772. Similar to the example of FIG. 7A, the array of contrasting regions includes an array of anisotropic reflecting regions formed by a series of concave-shaped features in the outer surface of the spindle 772. In the example configuration depicted in FIG. 7C, the reflecting regions are interspersed with an array of optically-absorptive regions, which are substantially free of concave features. In some embodiments, the optically-absorptive regions are formed by machining, grinding, or otherwise removing material to form a substantially flat surface. In some embodiments, the optically-absorptive regions are formed by laser etching or laser ablating the region to form a flattened or substantially flat region.

Figure 7D:
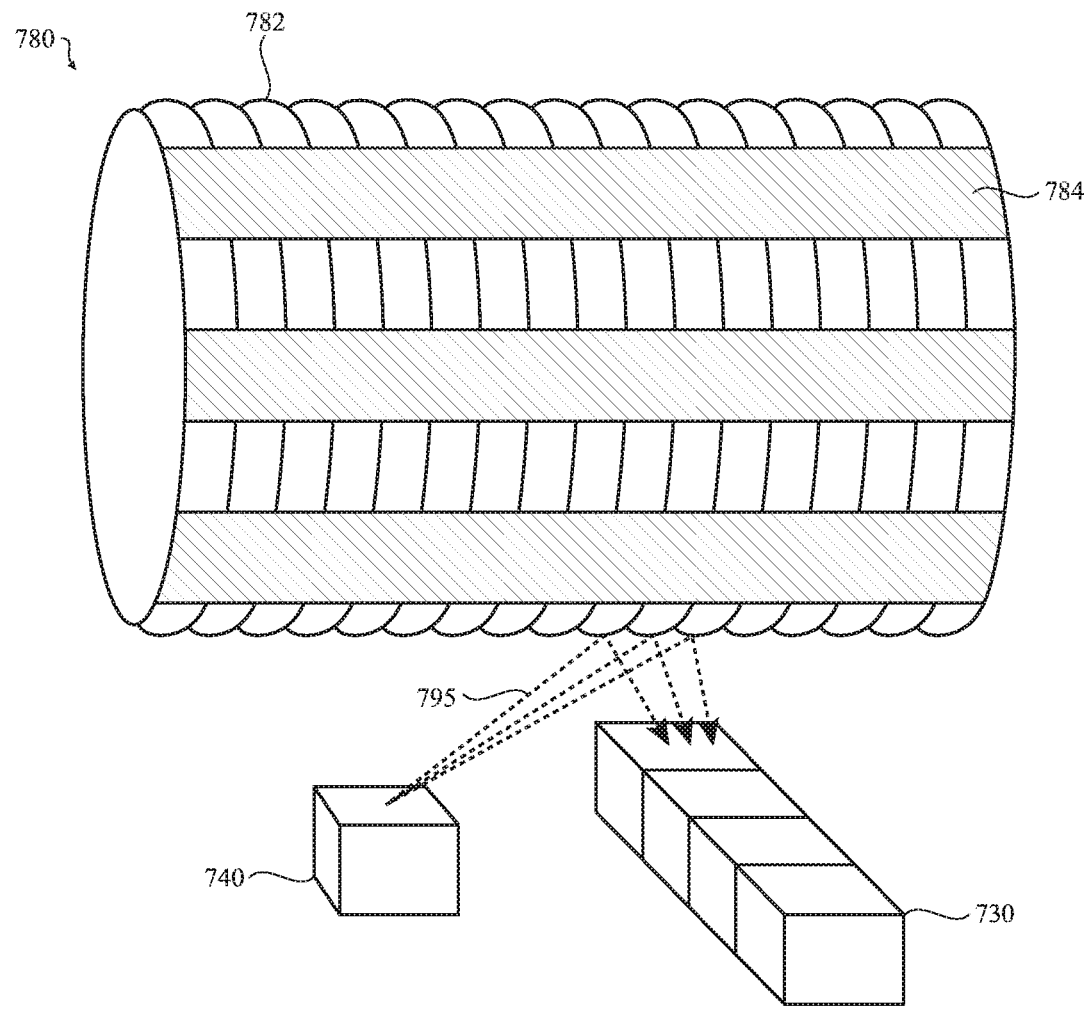

FIG. 7D depicts an example optical encoder 780 including a spindle 782, optical emitter 740, and optical detector 730. Similar to the previous examples, the optical emitter 740 is configured to produce an emitted beam 795 that is reflected off the encoded pattern 784 formed on the outer surface of the spindle 782. In the present embodiments, the encoded pattern 784 includes an array of contrasting regions extending along a length of the spindle 782. Similar to the example of FIG. 7B, the array of contrasting regions includes an array of anisotropic reflecting regions formed by a series of convex-shaped features in the outer surface of the spindle 782. In the example configuration depicted in FIG. 7D the reflecting regions are interspersed with an array of optically-absorptive regions, which are substantially free of concave features. In some embodiments, the optically-absorptive regions are formed by machining, grinding, or otherwise removing material to form a substantially flat surface. In some embodiments, the optically-absorptive regions are formed by laser etching or laser ablating the region to form a flattened or substantially flat region.

As described with respect to previous examples, an optical encoder may include both light (or reflective) and dark (or optically-absorptive) regions to form the encoded pattern. Additionally or alternatively, in some embodiments, the entire spindle may have a contoured shape that directs the light toward or away from the optical detector of the encoder. In some implementations, the spindle surface may have a substantially uniform surface finish. For example, in some embodiments, the surface of the spindle may be substantially specular (e.g., the spindle provides a substantially specular reflection) and grooves, cuts, or other features are formed along the length of the spindle to reflect the light in an alternating fashion. In such embodiments, the spindle may have one or more striations, grooves, flutes, channels, or similar features formed along the length of the spindle.

Figure 8A:
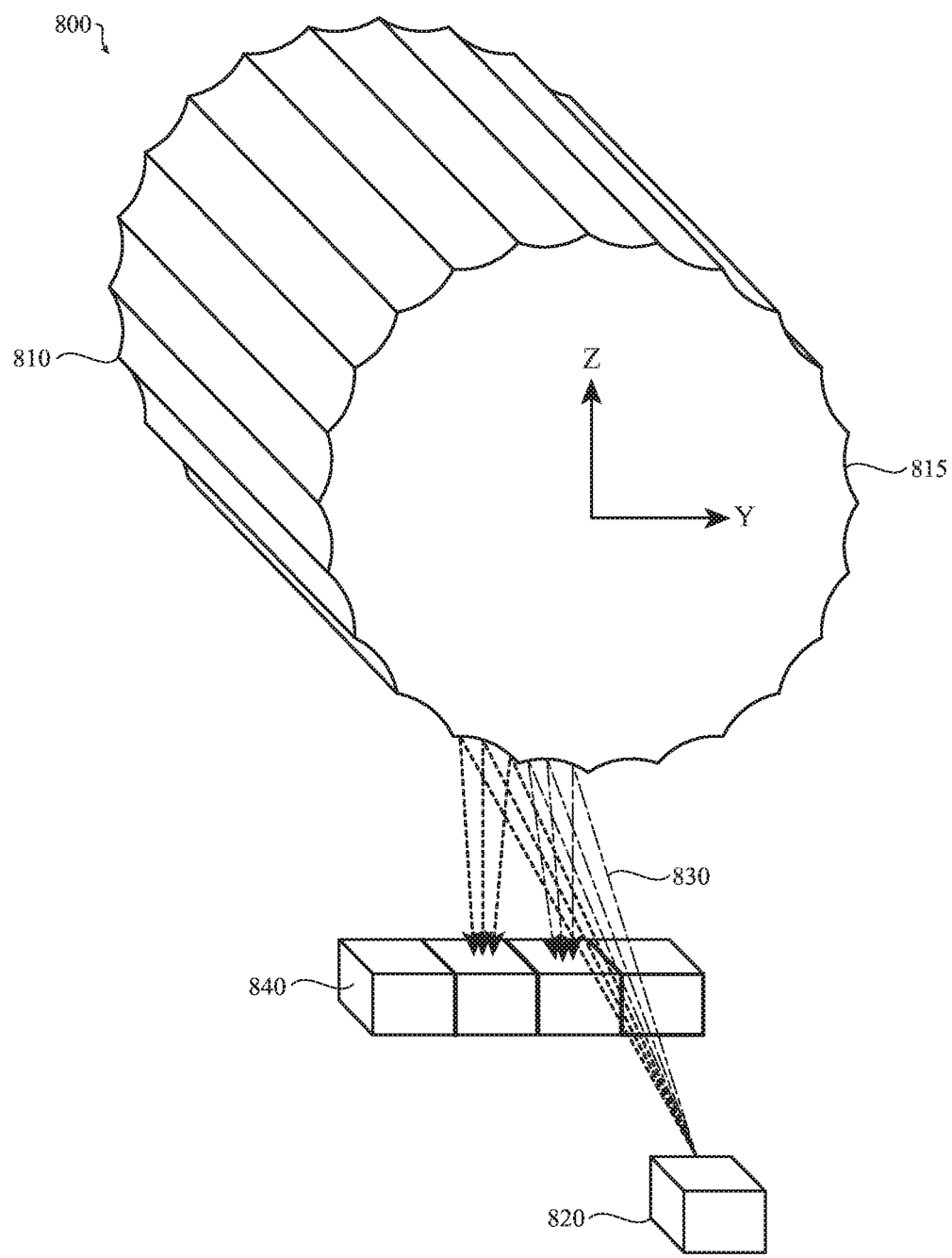
FIGS. 8A-8C illustrate an optical encoder having contoured regions formed into the surface of the spindle for producing alternating light and dark.

FIG. 8A depicts an example spindle 810 of an optical encoder 800 that includes a plurality of features 815 that are formed along the length of the spindle 810. The features 815 may include an array of length-wise or axially aligned cuts that may be described as flutes, channels, scallops, or other similar features. In general, the features 815 may direct a light beam 830 produced by the optical emitter 820 into a pattern of reflected light that includes alternating light and dark reflected portions. In some cases, the alternating light and dark portions simulate or resemble a diffraction pattern. As the spindle 810 rotates, the alternating light portions may pass over the photodiodes of the optical detector 840 which may be used to determine the amount of rotation, the direction of rotation, the rate of rotation, the change of rate of rotation, and so on similar to the embodiments described above with respect to other encoder embodiments.

In some embodiments, the features 815 are combined with light-reflecting and light-absorbing or non-reflective regions to produce an alternating reflection. In other embodiments, the features 815 may create an alternating light and dark reflection even if there is no variation in color or surface reflectance from the spindle 810. Such embodiments may be advantageous in that it may not require the formation of contrasting or optically-distinguishable regions on the surface of the spindle 810.

In some embodiments, the surface features 815 may be formed on the surface of the spindle 810 as part of a molding, casting, forging, or other similar manufacturing process. In some embodiments, the surface features 815 may be formed by machining, grinding, or otherwise removing material from the surface of the spindle 810. Additionally, while the features 815 depicted in FIG. 8A are shown as being formed along the length of the spindle 810, it may not be necessary that the features extend the entire length of the spindle 810 and may, instead, be formed over a relatively short portion of the spindle's 810 outer surface.

Figure 8B:
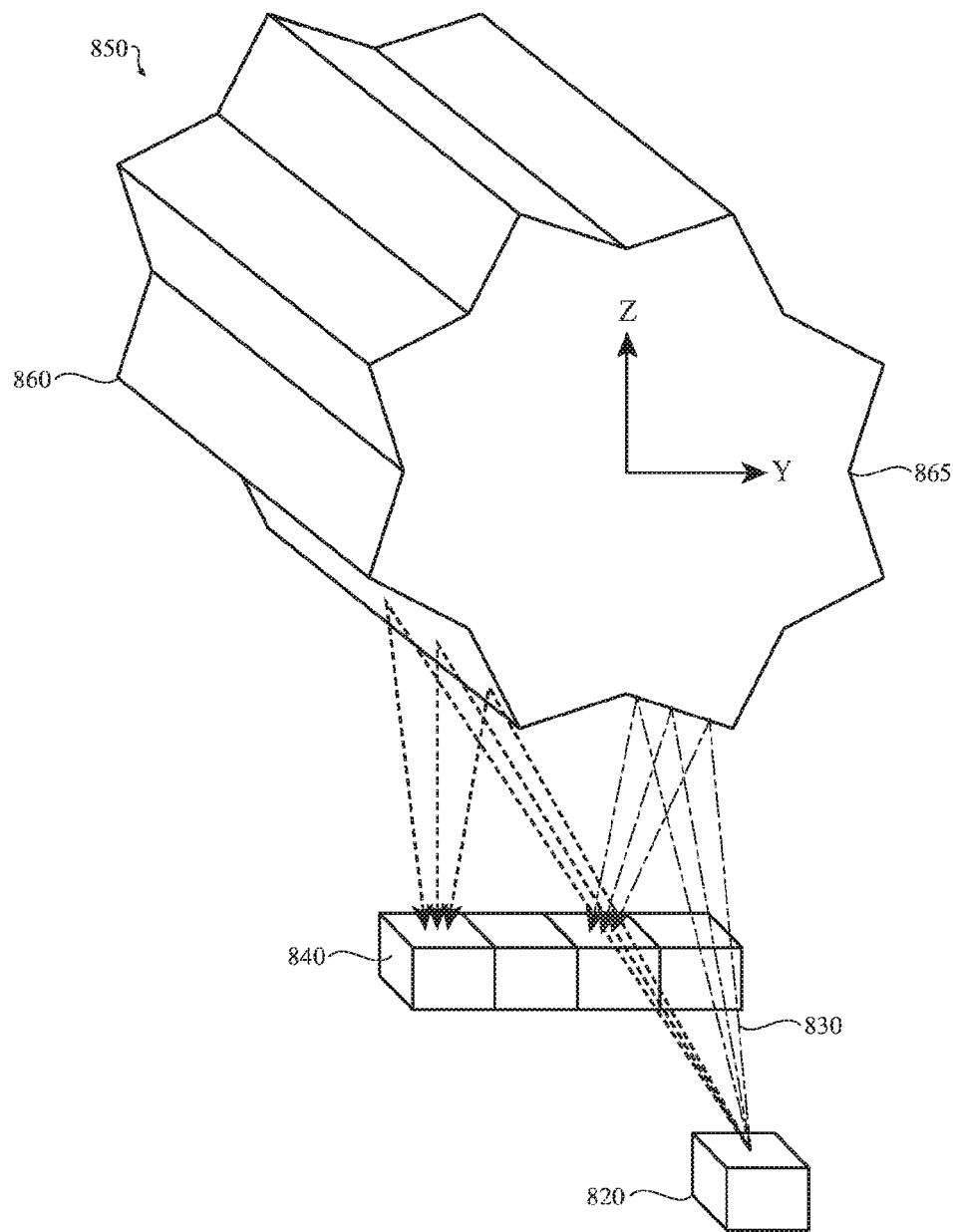

FIG. 8B depicts another alternative encoder 850 having an array of facet surface features 865 formed in the outer surface of the spindle 860. Similar to the previous example, the optical emitter 820 may produce a beam of light 830 that is reflected off the surface of the spindle 860. In the example depicted in FIG. 8B, the facet features 865 cause a reflected pattern having alternating light and dark portions, which may pass across the photodiodes of the optical detector 840 as the spindle 860 rotates. In the present example, the facet features 865 are formed as an array of flat facet features along the surface of the spindle 860 that reflect the light in different directions to produce the alternating light portions.

Figure 8C:
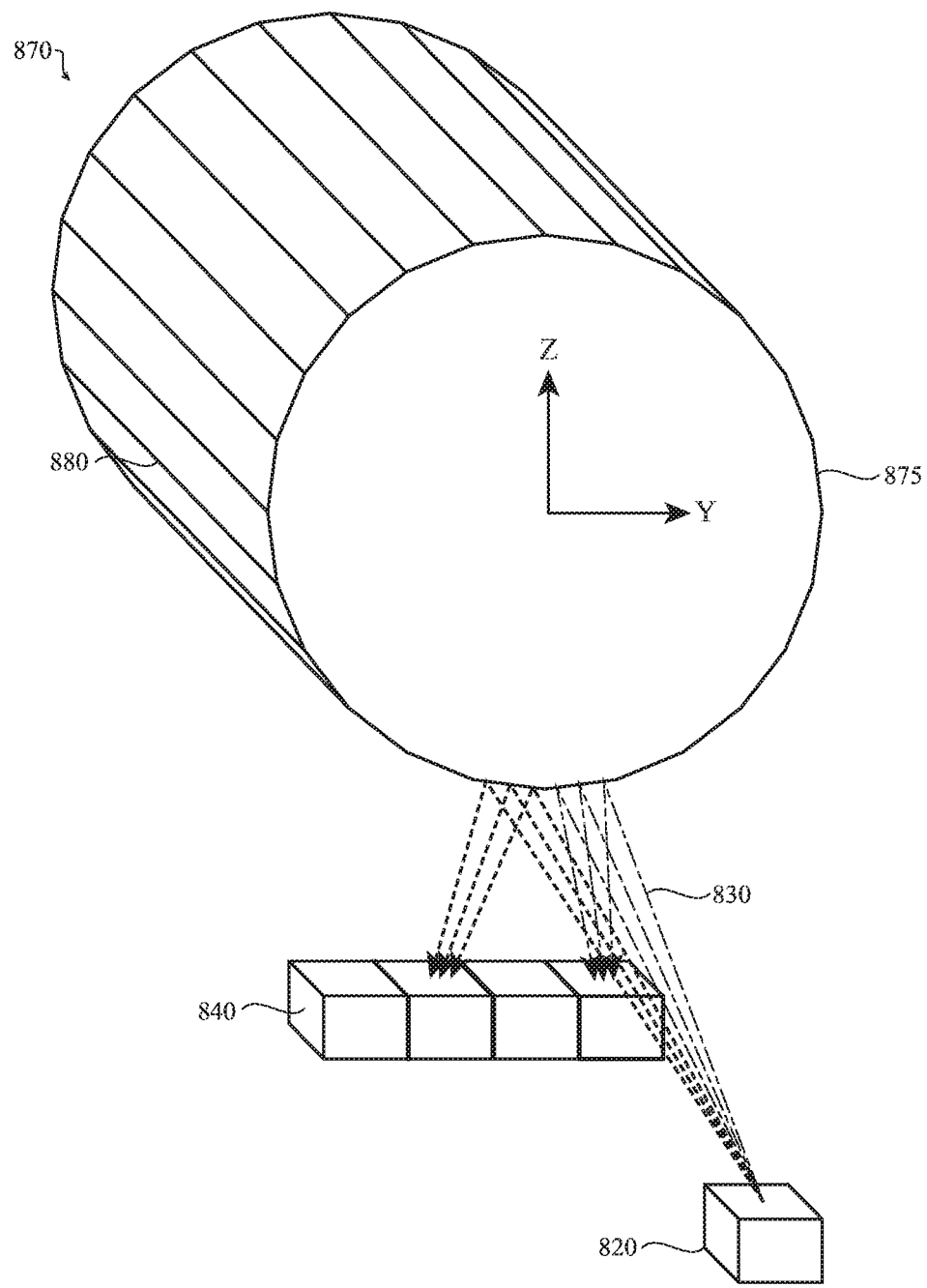

FIG. 8C depicts another alternative encoder 870 having an array of flat facet surface features 875 formed in the outer surface of the spindle 880. In some embodiments, the flat facet surface features 875 may be arranged as being tangent to an inscribed circle (not shown). Similar to the previous example, the optical emitter 820 may produce a beam of light 830 that is reflected off the surface of the spindle 880. In the example depicted in FIG. 8C, the facet features 865 cause a reflected pattern having alternating light and dark portions, which may pass across the photodiodes of the optical detector 840 as the spindle 880 rotates. In the present example, the facet features 875 are formed as an array of flat facet features along the surface of the spindle 880 that reflect the light in different directions to produce the alternating light portions. While different flute and facet geometry and feature arrangements are depicted in FIGS. 8A-8C, these examples are merely illustrative and other alternative facet arrangements may also be used.

In some embodiments, the axially aligned features (e.g., flutes, facets, scallops, and the like) that are formed along the length of a spindle have a substantially specular surface finish. While a specular surface finish may be advantageous for maximizing the amount of light that is received by the optical detector, a specular finish may not facilitate or accommodate normal variations or a reasonable degree of variation in the positions of the various components. For example, as the position and/or alignment of the optical emitter and/or the optical detector vary with respect to the spindle, the reflected beam may partially or entirely miss the optical detector. Thus, as previously mentioned, spreading the distribution of the reflected light, for example, in a plane that is aligned with the length of the spindle, may allow for some variation in the position and/or alignment of the components of the encoder. FIG. 9A through FIG. 11B depict aspects of example systems that may be used to widen the distribution of the reflected light to reduce the encoder's sensitivity to positional and/or dimensional variations.

Figure 9A:
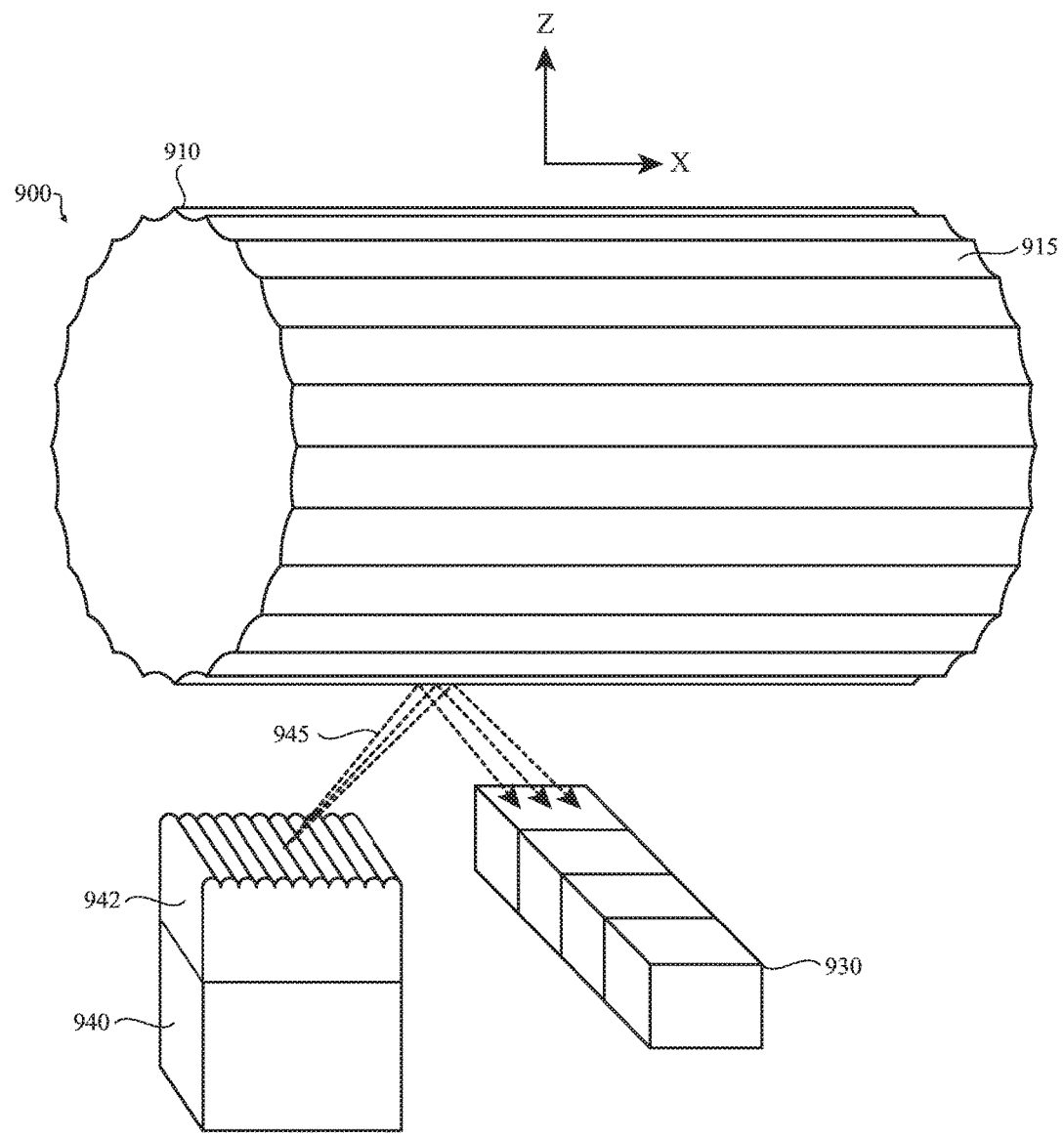
FIG. 9A depicts an example optical encoder having an optically diffusing member positioned relative to the optical emitter.

In some embodiments, an optically diffusing member may be disposed or positioned relative to one or more of the optical elements and may widen the distribution of the light on the optical detector. FIG. 9A depicts an example optical encoder 900 having an optically diffusing member 942 positioned relative to the optical emitter 940. In particular, the encoder 900 of FIG. 9A includes an optically diffusing member 942 that is positioned adjacent to a light-emitting face of the optical emitter 940. As shown in FIG. 9A, the optically diffusing member 942 may be used to produce a beam of light 945 having a widened beam distribution along the axis of the spindle 910.

In some embodiments, the optically diffusing member 942 is configured to widen the distribution of the beam of light 945 along a primary direction to produce a direction-dependent light distribution. In particular, the optically diffusing member 942 may include an array of surface features or optical elements that spread or widen the distribution of the light along the primary direction but do not substantially spread or widen the distribution of light along another direction that is transverse (e.g., perpendicular) to the primary direction. In some embodiments, the optically diffusing member 942 may include an array of elongated lenses or ridges that are configured to distribute the light along the primary direction in a greater amount than in other directions that are transverse to the primary direction. An example optically diffusing member is described below with respect to FIG. 10.

As shown in FIG. 9A, the encoder 900 may include a spindle 910 that is formed from a substantially uniform and optically specular surface. Similar to the example described above with respect to FIG. 8A, the spindle 910 may include a plurality of features 915 that are formed along the length of the spindle 910. The features 915 may include an array of length-wise or axially aligned cuts that may be described as flutes, channels, scallops, or other similar features. In general, the features 915 may direct a light beam 945 produced by the optical emitter 940 into a pattern of reflected light that includes alternating light and dark reflected portions, which may resemble a diffraction pattern. As the spindle 910 rotates, the alternating light portions may pass over the photodiodes of the optical detector 930 which may be used to determine the amount of rotation, the direction of rotation, the rate of rotation, the change of rate of rotation, and so on similar to the embodiments described above with respect to other encoder embodiments.

In some embodiments, the optical encoder 900 includes both a fluted spindle 910 (having a specular surface finish) and an optically diffusing member 942. As previously mentioned, the fluted features 915 of the spindle 910 may be used to direct the light in a pattern across the LEDs as the spindle 910 is rotated. The optically diffusing member 942 spreads the light along the axial or length direction of the spindle 910 to reduce the effects of beam misalignment due to normal or reasonable positional or dimensional variations within the encoder 900. By separating the pattern formation and the beam spreading functions, the performance of each element, whether it is the features 915 or the optically diffusing member 942, may be optimized for the respective optical function. In some cases, separating optical functions may also simplify the manufacturing of each element or component. In contrast, FIGS. 11A and 11B described in more detail below, depict a spindle having surface features that are configured to provide both pattern formation across the optical detectors and optical diffusion or beam spreading along the axis or length direction of the spindle.

While the example depicted in FIG. 9A includes a combination of the optically diffusing member 942 used in combination with a spindle 910 having fluted features 915, the same principle may be applied to spindles having a variety of shapes and configurations. For example, the optically diffusing member 942 of FIG. 9A may be combined with any of the other spindle examples 850 and 870 described above with respect to FIGS. 8B and 8C. Additionally, the optically diffusing member 942 may be combined with one or more of the optical encoders 400, 500, 700, 750, 770, 780 described above with respect to previous figures.

Figure 9B:
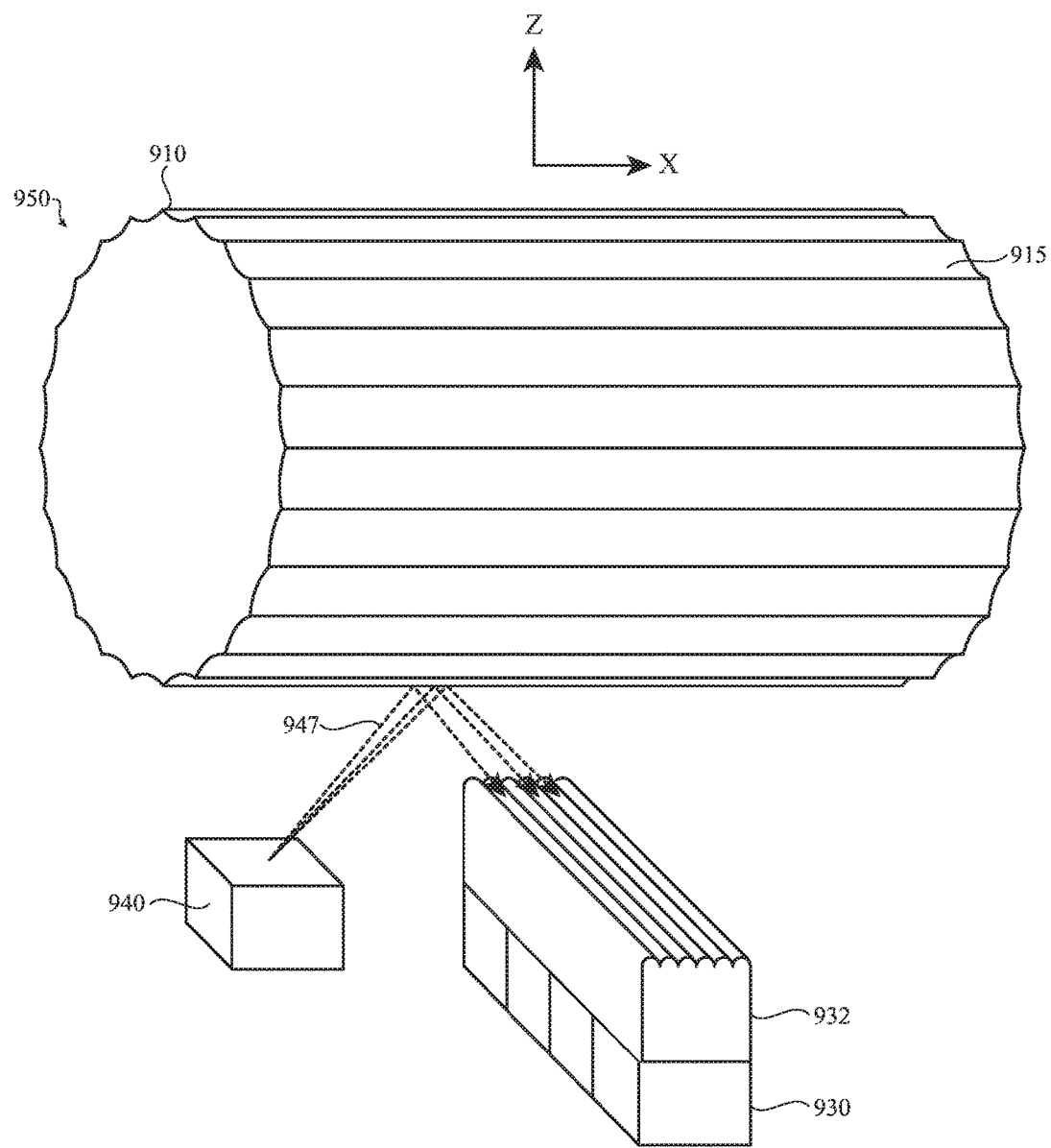
FIG. 9B depicts an example optical encoder having an optical diffusing member positioned relative to the optical detector.

FIG. 9B depicts an example optical encoder 950 having an optical diffusing member 932 positioned relative to the optical detector 930. In particular, the encoder 950 of FIG. 9B includes an optically diffusing member 932 that is positioned adjacent to a light-receiving face of the optical detector 930. The optically diffusing member 932 may help to distribute the light that is reflected by the spindle 910 across the optical detector 930 in a direction that is generally along the axis or length of the spindle 910.

Similar to the previous example, in some embodiments, the optically diffusing member 932 is configured to widen the distribution of light along a primary direction to produce a direction-dependent light distribution. In particular, the optically diffusing member 932 may include an array of surface features or optical elements that spread or widen the distribution of the light along the primary direction but do not substantially spread or widen the distribution of light along another direction that is transverse (e.g., perpendicular) to the primary direction. In some embodiments, the optically diffusing member 932 may include an array of elongated lenses or ridges that are configured to distribute the light along the primary direction in a greater amount than in other directions that are transverse to the primary direction. An example optically diffusing member is described below with respect to FIG. 10.

Similar to the previous example, the encoder 950 of FIG. 9B includes a spindle 910 that is formed from a substantially uniform and optically specular surface and may include a plurality of features 915 that are formed along the length of the spindle 910. As described above, the features 915 may direct a light beam 947 produced by the optical emitter 940 into a pattern of reflected light that includes alternating light and dark reflected portions, which may be used to determine or measure aspects of the rotation of the spindle 910.

While the example depicted in FIG. 9B includes a combination of the optically diffusing member 932 used in combination with a spindle 910 having fluted features 915, the same principle may be applied to spindles having a variety of shapes and configurations. For example, the optically diffusing member 932 of FIG. 9B may be combined with one or more of the optical encoders 400, 500, 700, 750, 770, 780, 800, 850, 870 described above with respect to previous figures. Additionally, an encoder may include both an optically diffusing member 942 on the optical emitter 940, as shown in FIG. 9A, with the optically diffusing member 932 on the optical detector 930, as shown in FIG. 9B.

Figure 9C:
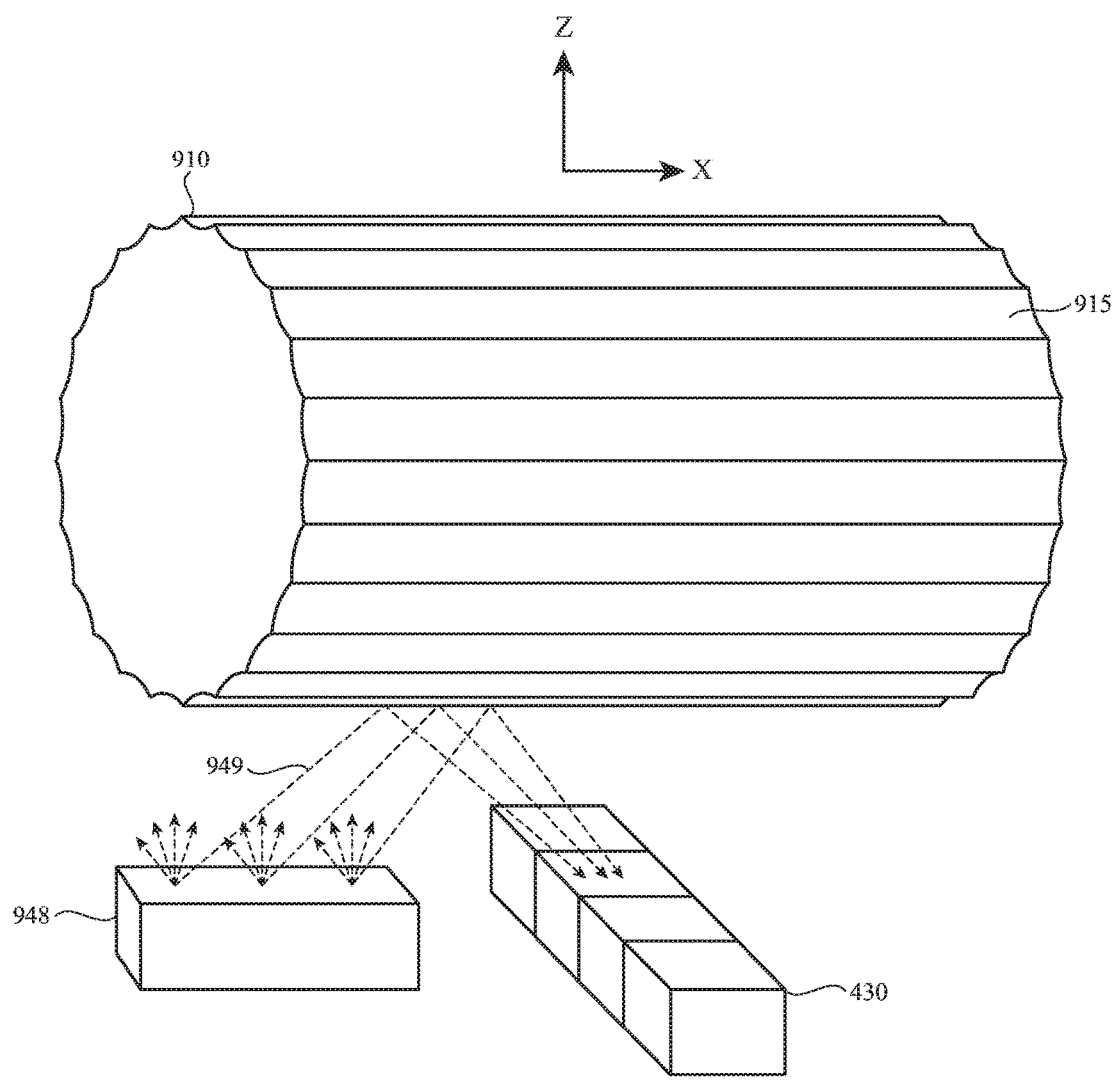
FIG. 9C depicts an example optical encoder having an elongated optical emitter.

FIG. 9C depicts an example optical encoder 960 having an elongated optical emitter 948. In some embodiments, the elongated optical emitter 948 may be used to increase the distribution of light along the axis or length direction of the spindle 910, which may reduce sensitivity to positional and/or dimensional variations. As shown in FIG. 9C, the optical emitter 948 may be used to produce an emitted beam 949 that is more widely distributed along the axis or length of the spindle 910 as compared to other directions that are transverse (e.g., perpendicular) to the length of the spindle 910. In some cases, the widened distribution increases the chance that the reflected pattern of light will be incident to the optical detector 930.

In some cases, the elongated optical emitter 948 may be formed from an elongated light-emitting diode (LED) element. Additionally or alternatively, the elongated optical emitter 948 may be formed using a slotted or slit opening that is positioned adjacent to the light-emitting face of the optical emitter 948. In some cases, other optical elements, such as lenses or shields, may be used to produce the light beam 949 having a direction-dependent distribution, as shown in FIG. 9C.

While the elongated optical emitter 948 is depicted as being combined with a fluted spindle 910, the elongated optical emitter 948 may be combined with other types of spindles and other optical elements described with respect to other optical encoder embodiments. For example, the elongated optical emitter 948 of FIG. 9C may be combined with one or more of the optical encoders 400, 500, 700, 750, 770, 780, 800, 850, 870, 900, 950 described above with respect to previous figures.

Figure 10:
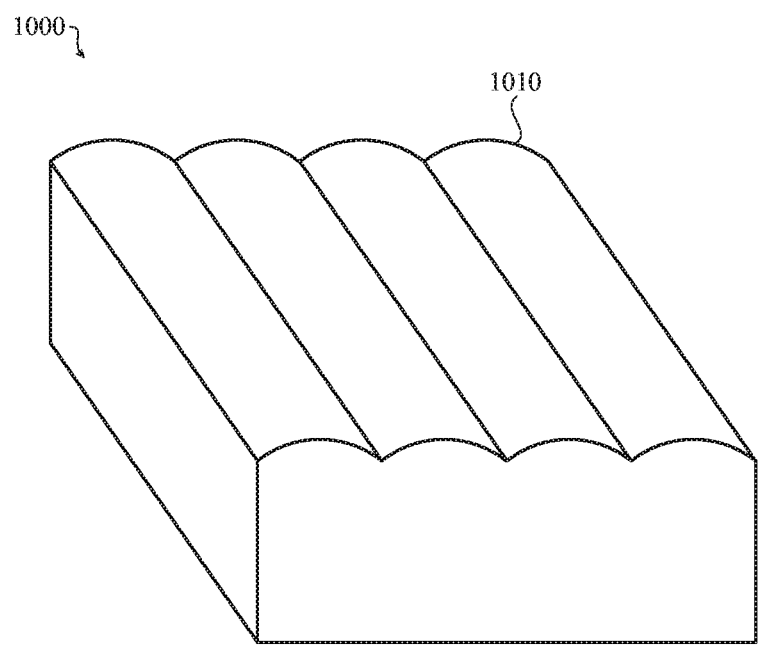
FIG. 10 depicts an example optically diffusing member.

FIG. 10 depicts an example optically diffusing member 1000. As depicted, the optically diffusing member 1000 may be used to produce a direction-dependent optical beam distribution. For example, the optically diffusing member 1000 may be used to produce a light beam that is more widely distributed along a first direction than in a second direction that is transverse to the first direction. In the depicted example, the optically diffusing member 1000 may be configured to produce a beam having a wider distribution in a direction that is substantially perpendicular to the length of the cylindrical lens features 1010.

As shown in FIG. 10, the optically diffusing member 1000 includes an array of elongated lens features 1010 formed along a surface of the optically diffusing member 1000. In the present example, the elongated lens features 1010 are formed as an array of partially cylindrical lenses. In other examples, the optically diffusing member 1000 may include an array of elongated ridges, protrusions, or other positive features formed into the surface of the diffusing member 1000. Similarly, the optically diffusing member 1000 may include an array of elongated cuts, scallops, or other negative features formed into the surface of the diffusing member 1000. The optically diffusing member 1000 may be formed from an optically transmissive material, including, for example, glass, sapphire, plastic, and the like.

The optically diffusing member 1000 of FIG. 10 may correspond to either of the optically diffusing members 942 and 932 of FIGS. 9A and 9B, respectively. In particular, the size and shape of the optically diffusing member 1000 may be adapted to produce a direction-dependent light distribution for light that is emitted from, for example, the optical emitter 940 of FIG. 9A. Similarly, the size and shape of the optically diffusing member 1000 may be adapted to produce a direction-dependent light distribution for light that is received by, for example, the optical detector 930 of FIG. 9B. In general, the elongated lens features 1010 of the optically diffusing member 1000 may be arranged to be transverse to (e.g., perpendicular to) the axis or length direction of the spindle 910 of either examples depicted in FIGS. 9A and 9B.

In some embodiments, the pattern forming features of the spindle may be integrated with beam widening or diffusing features formed into the same surface. For example, in some embodiments, the spindle includes axially or lengthwise features that are used to form alternating light and dark regions across the optical detector similar to the examples described above with respect to FIGS. 8A and 8B. Additionally, other features may be integrally formed with the axial or lengthwise features that increase the distribution of reflected light along a particular direction. One advantage to this approach is that a single spindle may have a shape that both produces both the light and dark regions used to detect rotation of the spindle and also produce a widened beam to improve the encoder's tolerance to dimensional and positional variations.

Figure 11A:
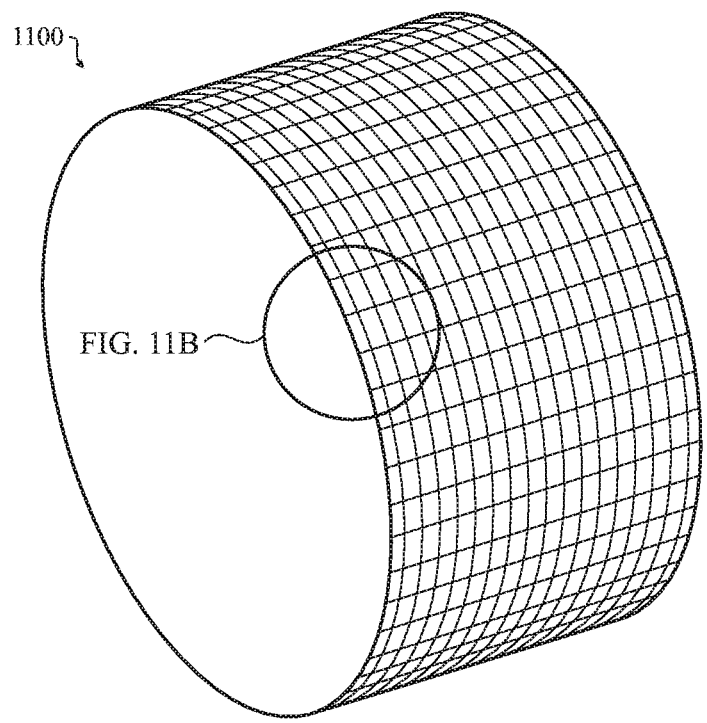
FIGS. 11A-11B depict an example spindle of an optical encoder that includes both reflective pattern and optically diffusing surface features.
Figure 11B:
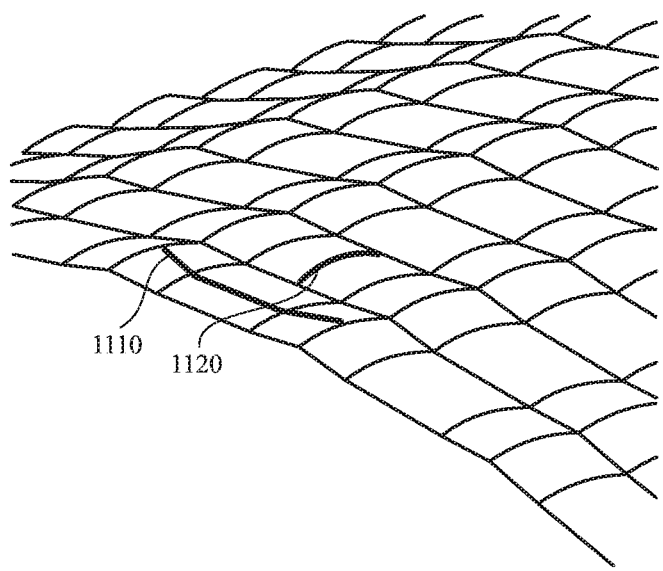

FIGS. 11A-11B depict an example spindle 1100 of an optical encoder that includes both optical pattern-forming and optically diffusing surface features. In particular, the spindle 1100 includes an array of surface features that have a concave contour 1110 as indicated in FIG. 11B. In some cases, the concave contour 1110 performs a beam-directing function similar to the fluted features of FIG. 8A. In particular, the concave contour 1110 may be used to create a pattern of alternating light and dark regions that may be detected by an optical detector, similar to other examples described above with respect to FIGS. 8A, 8B, and 8C. In some cases, the concave contour 1110 is defined by three surfaces that form a depression or concave feature in the surface of the spindle 1100. As shown in FIG. 11B, the concave contour 1110 includes a substantially flat bottom contour region and two angled contour regions, each extending from either end of the flat bottom contour region. As shown in FIG. 11B, the concave contour 1110 represents the shape of the feature at one location within the concave feature and may vary in shape and size within the concave feature. Additionally, the concave contour 1110 is provided as one example and other implementations may vary in shape without departing from the overall concept of the embodiment.

As shown in FIG. 11B, the array of surface features may also have a convex contour 1120 that is generally arranged perpendicular to the concave contour 1110. In some cases, the convex contour 1120 performs a beam-distribution widening function similar to the concave features 762 and 782 described above with respect to FIGS. 7B and 7D, respectively. In particular, the convex contour 1120 may produce a direction-dependent beam-widening reflected light distribution that may increase the distribution of light that is reflected along the axis or length direction of the spindle 1100. As shown in FIG. 11B, the convex contour 1120 is formed from an arc-shaped feature that extends along the (flat) bottom portion of the concave contour 1110. While this is depicted as merely one example, other implementations may vary in shape without departing from the overall concept of the embodiment.

One advantage to the configuration of the spindle 1100 depicted in FIGS. 11A-11B is that a single piece may include multiple features that facilitate an accurate and repeatable reflected optical pattern across the optical detector of the encoder. While the spindle 1100 may have a surface that is relatively complex, the overall manufacturability of the encoder may be improved due to reduced part count, reduced part alignment, and other potentially beneficial trade-offs.

In some embodiments, the spindle 1100 may be formed using a variety of manufacturing processes. For example, the spindle 1100 may be formed from a polymer or other moldable material using an injection molding or casting process. In some embodiments, the spindle 1100 is formed from a polymer or plastic material that is then coated with a reflective or metalized material. In some cases, the spindle 1100 is formed from a high-temperature resistant polymer and coated with a gold layer using a physical vapor deposition (PVD) or other deposition process. In some embodiments, the spindle 1100 may be machined, cast, forged, or otherwise shaped out of a metal material such as aluminum, bronze, brass, gold, silver, and so on. While not shown in FIGS. 11A and 11B, the spindle 1100 may also include a through hole or other feature that is used to couple the spindle 1100 with a shaft or other element of an optical encoder.

In some embodiments, the spindle may be formed from a separate part that is joined, coupled, or otherwise operatively coupled to other components of the encoder and/or an input mechanism, such as a crown. In some embodiments, the spindle may be formed from a sleeve, cap, or other form factor that may be attached to a shaft. For example, FIGS. 12A-12B depict a spindle sleeve and spindle cap, respectively, attached to a shaft of a mechanism.

Figure 12A:
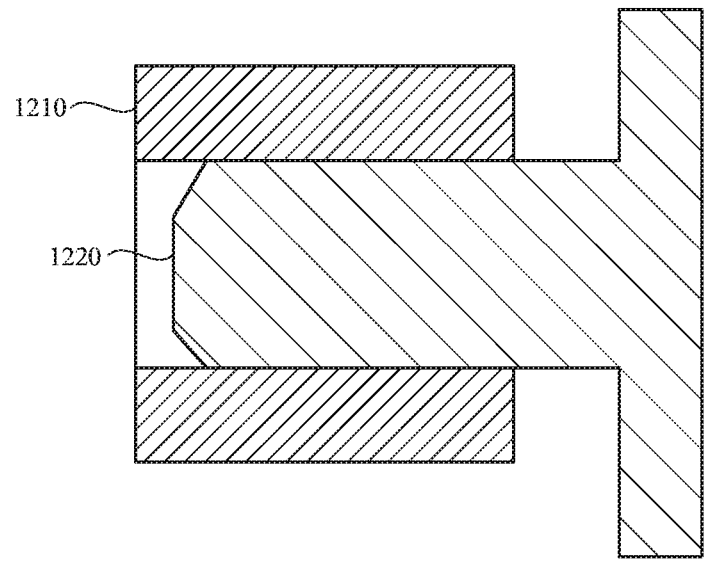
FIGS. 12A-12B illustrate a spindle sleeve and spindle cap.

As shown in FIG. 12A, the spindle 1210 may be formed as a sleeve having a hollow inner portion or aperture formed through the spindle 1210. The outer surface of the spindle 1210 may be formed in accordance with or include any of the optical features described with respect to the encoder embodiments previously discussed. In particular, the outer surface of the spindle 1210 may include an encoded pattern that may be used to determine rotational information about the spindle 1210. In the following examples, the shaft 1220 may form part of a user-input device, such as a crown or rotating element. In some cases, the shaft 1220 is operatively coupled to the dial of a crown, as described above with respect to FIGS. 1A-1B.

The inner surface or aperture formed of the spindle 1210 may be formed to receive and attach to or otherwise couple to the shaft 1220. In some embodiments, the aperture of the spindle 1210 may be a slip fit or clearance fit with respect to the outer surface of the shaft 1220. The spindle 1210 may be attached to the surface of the shaft 1220 using an adhesive or other bonding agent placed between the two components. In some embodiments, the spindle 1210 may be attached to the shaft 1220 using a threaded fastener or other attachment method. In other embodiments, the spindle 1210 may be configured to form a press fit or interference fit with the shaft 1220.

Figure 12B:
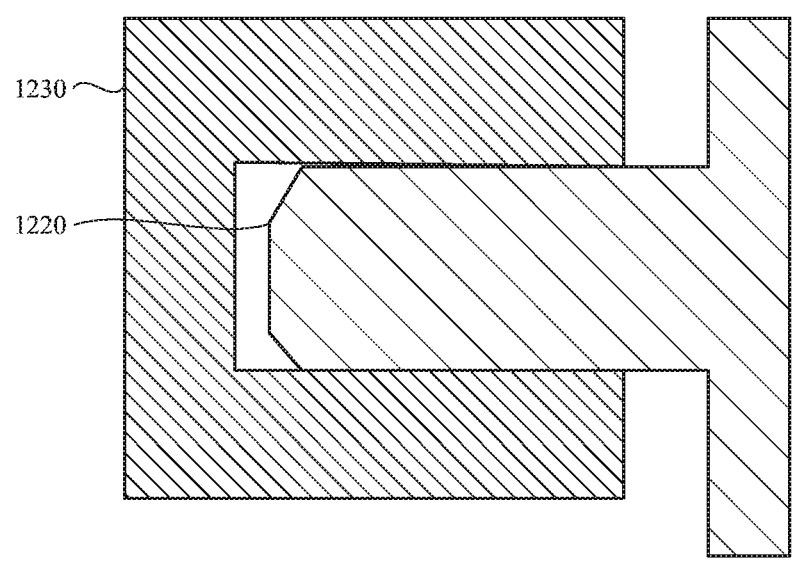

As shown in FIG. 12B, the spindle 1230 may alternatively be formed as a cap-shaped part having a hollow inner portion recess formed into a portion of the spindle 1230. As explained with respect to the previous example, the outer surface of the spindle 1230 may be formed in accordance with or include any of the optical features described with respect to the encoder embodiments previously discussed. In particular, the outer surface of the spindle 1230 may include an encoded pattern that may be used to determine positional (e.g., rotational) information about the spindle 1230.

In either of the examples of FIGS. 12A and 12B, the spindles 1210, 1230 may be formed using a variety of manufacturing processes. For example, the spindles 1210, 1230 may be formed from a polymer or other moldable material using an injection molding or casting process. In some embodiments, the spindles 1210, 1230 are formed from a polymer or plastic material that is then coated with a reflective or metalized material. In some cases, the spindles 1210, 1230 are formed from a high-temperature resistant polymer and coated with a gold layer using a physical vapor deposition (PVD) or other deposition process. In some embodiments, the spindles 1210, 1230 may be machined, cast, forged, or otherwise shaped out of a metal material such as aluminum, bronze, brass, gold, silver, and so on.

Figure 13:
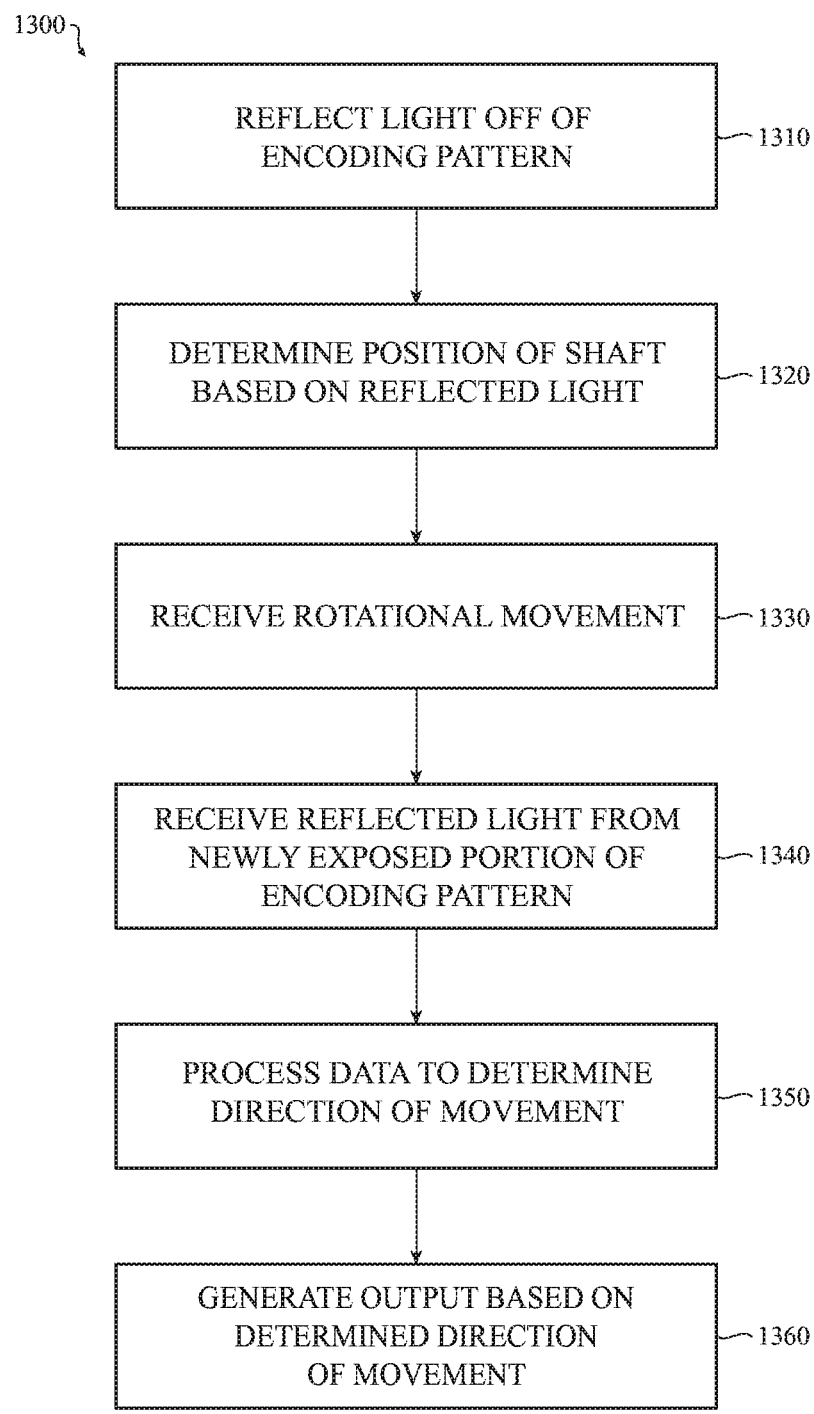
FIG. 13 illustrates a method for detecting movement of a component of an electronic device.

FIG. 13 illustrates a method 1300 for collecting and determining movement of a spindle of an optical encoder according to one or more embodiments of the present disclosure. In embodiments, the method 1300 may be used to determine rotational movement of the spindle, angular movement of the spindle, translational movement of the spindle as well as a speed of movement of the spindle. Further, the method 1300 described below may be used with the embodiments shown and described above with respect to FIG. 1A through FIG. 12B.

In operation 1310, light from an optical emitter is reflected off of an encoded pattern that is disposed on a spindle of an optical encoder. The encoded pattern disposed on the spindle may include a plurality of light and dark regions or stripes that are axially disposed along a length of the spindle of the optical encoder in accordance with any of the examples provided above.

In another embodiment, the spindle of the optical encoder may include one or more surface features such as shown in FIGS. 8A-8C. In such embodiments, the surface features may be used to reflect light in a variety of different directions. The surface features may be used in conjunction with the light and dark markings of the encoded pattern. In alternative embodiments, the surface components may be used without the need of either one or both of the light markings of the encoded pattern or the dark markings of the encoded pattern.

In operation 1320, the light that is reflected off of the encoded pattern is received by an optical detector such as a photodiode array, which may be used to determine a position of the spindle. As discussed above, both the optical emitter and the photodiode array may be axially aligned with the spindle. In another embodiment, both the optical emitter and the photodiode array are radially aligned with respect to the spindle. Although axial alignment and radial alignment are specifically mentioned, other alignments may be used. When the photodiode array receives the reflected light, an initial position of the spindle may be determined. Specifically, as light is reflected from the encoded pattern and received by the photodiode array, the photodiode array outputs a current which may correspond to the amount and/or position of light and dark stripes that are proximate to the photodiode array. This output current may then be used to determine a position of the spindle at a time t.

In operation 1330, movement of the spindle is received. In another embodiment, the movement may be rotational movement, translational movement, angular movement or combinations thereof. For example, a crown of an electronic device may be rotated to change an output on a display such as described above. In another embodiment, the crown may be pushed inward or pulled outward.

In operation 1340, light from the newly exposed portion of the encoded pattern is received by the array of photodiodes. When the newly reflected light is received, the photodiode array may output a current based on the intensity of the reflected light. Once the reflected light from the newly exposed encoded pattern is received, the output of the photodiode array may be used to determine a direction of movement of the spindle. In some embodiments, the speed of the movement of the spindle may also be determined.

In some embodiments, operation 1350 includes comparing the output of the photodiode array from operation 1320 with the output of the photodiode array from operation 1340. For example, light intensity received by one or more photodiodes of the photodiode array at a first time may be compared against light intensity received by one or more photodiode at a second time. In some cases, multiple time intervals are sampled and a phase in the change of current or other measurement may be used to determine the direction of rotation of the spindle. Although the example above specifies two time samples are used to determine the movement of the spindle, operation 1350 may use any number of samples, sequential or otherwise, to determine a directional movement of the spindle of the encoder.

Further, operation 1350 may be used to determine a speed of rotation of the spindle. For example, as the photodiode array outputs the detected change in current, the speed of the change may also be monitored. The change in speed may then be used to determine the overall speed of the movement of the spindle.

In operation 1360, output is generated based on the determined direction of the movement of the spindle. For example, as a crown of an electronic device is rotated or otherwise moved, one or more icons or images of the display of the electronic device may need to be updated accordingly. For example, if the display of the electronic device is displaying a time keeping application, the crown of the electronic device may be rotated in either direction to change or adjust the position of the hands that are displayed by the time keeping application. Specifically, the hands that are displayed by the time keeping application may move in the direction and speed indicated by the determined movement and speed of the spindle such as described above.

Although embodiments have been described above with respect to a rotational and translational movement of a spindle of an electronic device, embodiments of the present disclosure are not so limited. For example, the crown of the electronic device shown with respect to FIG. 1A could be replaced by a keycap for a keyboard. Thus, each key of the keyboard may be optically encoded for translational movement or other types of movement. In other embodiments, the optical encoder disclosed herein could be used with a button on a sliding switch and the like.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

What is claimed is:

1. An optical encoder for an electronic device, the optical encoder comprising:
    a spindle configured to rotate about a central axis;
    an optical emitter configured to illuminate a portion of the spindle;
    an optical detector configured to receive light from the illuminated portion of the spindle; and
    an array of contrasting regions formed on an outward-facing surface of the spindle and extending along a length of the spindle, wherein the array of contrasting regions includes a set of optically anisotropic regions interspersed with a set of optically-absorptive regions, wherein
    an optically anisotropic region of the set of optically anisotropic regions is configured to:
        produce a first light distribution for light that is reflected along a transverse plane that is perpendicular to the central axis of the spindle; and
        produce a second light distribution for light that is reflected along a longitudinal plane that passes through the central axis of the spindle, wherein the second light distribution is wider than the first light distribution.

2. The optical encoder of claim 1, wherein the set of optically anisotropic regions is configured to produce a reflected-light distribution that varies in accordance with a direction of reflected light.

3. The optical encoder of claim 1, wherein each optically anisotropic region of the set of optically anisotropic regions is formed from a series of concave-shaped features that at least partially encircles the outward-facing surface of the spindle.

4. The optical encoder of claim 3, wherein the series of concave-shaped features has a depth to radius ratio between a maximum ratio of 13:1 and a minimum ratio of 7:1.

5. The optical encoder of claim 3, wherein the series of concave-shaped features is formed as a continuous spiral encircling the outward-facing surface of the spindle.

6. The optical encoder of claim 1, wherein each optically anisotropic region of the set of optically anisotropic regions is formed from a series of convex-shaped features that at least partially encircles the outward-facing surface of the spindle.

7. The optical encoder of claim 1, wherein the set of optically absorptive regions are formed by laser etching the outward-facing surface of the spindle to form a set of flattened regions.

8. The optical encoder of claim 1, wherein the set of optically absorptive regions are formed by depositing an ink on the outward-facing surface of the spindle.

9. The optical encoder of claim 1, wherein the optical detector includes an array of photodiodes that are arranged along the length to the spindle.

10. The optical encoder of claim 1, wherein the optical detector includes an array of photodiodes that are arranged along a direction that is transverse to the length of the spindle.

11. A portable electronic device comprising:
    a housing;
    a display positioned within an opening of the housing;
    a crown positioned on the housing and configured to receive rotational input;
    an optical encoder operatively coupled to the crown and configured to measure the rotational input, the optical encoder comprising:
        a spindle;
        an array of alternating regions formed on and extending along a length of the spindle; and
        an optical sensor configured to detect light reflected from the spindle and comprising:
            an optical emitter;
            an optical detector; and
            an optically diffusing member positioned adjacent a face of at least one of the optical emitter or the optical detector and configured to produce a light distribution that is wider in a direction along the length of the spindle.

12. The portable electronic device of claim 11, wherein:
    the optically diffusing member is positioned adjacent to a light-emitting face of the optical emitter.

13. The portable electronic device of claim 11, wherein:
    the optically diffusing member is positioned adjacent to a light-receiving face of the optical detector.

14. The portable electronic device of claim 11, wherein:
    the spindle includes an array of surface features that are configured to:
        produce an alternating pattern of light and dark regions to be detected by the optical sensor; and
        produce a widened reflected light distribution in a direction along the length of the spindle.

15. The portable electronic device of claim 11, further comprising:
    a shaft that is operatively coupled to the crown, wherein the spindle is disposed over a portion of the shaft.

16. The portable electronic device of claim 11, wherein the spindle includes an array of contoured regions that are configured to produce alternating light and dark reflections on the optical sensor.

17. The portable electronic device of claim 11, wherein:
    the spindle includes an array of flat facet features that extend at least partially along the length of the spindle; and
    the facet features are configured to produce alternating light and dark reflections on the optical sensor.

18. The portable electronic device of claim 11, wherein:
    the spindle includes an array of concave features that extend at least partially along the length of the spindle; and
    the concave features are configured to produce alternating light and dark reflections on the optical sensor.

19. The portable electronic device of claim 11, wherein the spindle is molded from a polymer material and coated with a reflective metal material.

20. The portable electronic device of claim 11, wherein one or more of the alternating regions are configured to:
    produce a first type of reflection having a first beam spread for light along a transverse plane that is perpendicular to a central axis of the spindle; and
    produce a second type of reflection having a second beam spread for light along a longitudinal plane that passes through the central axis of the spindle, wherein the second beam spread is wider than the first beam spread.

21. An optical encoder for an electronic device, the optical encoder comprising:
- a spindle;
- an optical emitter configured to illuminate a portion of the spindle;
- an optical detector configured to receive light from the illuminated portion of the spindle; and
- an array of features arranged along a length the spindle; wherein the array of features is configured to:
- produce alternating light and dark reflections on the optical detector;
- produce a first type of reflection having a first beam spread for light along a transverse plane that is perpendicular to a central axis of the spindle; and
- produce a second type of reflection having a second beam spread for light along a longitudinal plane that passes through the central axis of the spindle, wherein the second beam spread is wider than the first beam spread.

22. The portable electronic device of claim 21 wherein, the array of features includes an array of flat facet features that extends at least partially along the length of the spindle.

23. The portable electronic device of claim 21 wherein, the array of features includes an array of concave features that extends at least partially along the length of the spindle.

24. The portable electronic device of claim 21, wherein the spindle is molded from a polymer material and coated with a reflective metal material.

\* \* \* \* \*